US007362366B2

(12) United States Patent
Egawa et al.

(10) Patent No.: US 7,362,366 B2
(45) Date of Patent: Apr. 22, 2008

(54) HIGH-SPEED SOLID-STATE IMAGING DEVICE CAPABLE OF SUPPRESSING IMAGE NOISE

(75) Inventors: Yoshitaka Egawa, Yokohama (JP); Yoriko Tanaka, Nagoya (JP); Shinji Ohsawa, Ebina (JP); Yukio Endo, Yokohama (JP); Hiromi Kusakabe, Yokohama (JP); Nagataka Tanaka, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 671 days.

(21) Appl. No.: 10/875,781

(22) Filed: Jun. 25, 2004

(65) Prior Publication Data

US 2004/0233310 A1    Nov. 25, 2004

Related U.S. Application Data

(62) Division of application No. 09/322,994, filed on Jun. 1, 1999, now Pat. No. 6,801,256.

(30) Foreign Application Priority Data

| Jun. 2, 1998 | (JP) | ............................ 10-152805 |
| Jun. 2, 1998 | (JP) | ............................ 10-152807 |
| Jan. 6, 1999 | (JP) | ............................ 11-001139 |

(51) Int. Cl.
*H04N 3/14* (2006.01)
(52) U.S. Cl. .................. 348/308; 348/294; 348/300; 348/301
(58) Field of Classification Search ................ 348/300, 348/301, 303, 307, 309
See application file for complete search history.

(56) References Cited

U.S. PATENT DOCUMENTS 4,954,895 A * 9/1990 Akimoto et al. ............ 348/301
5,122,881 A * 6/1992 Nishizawa et al. ......... 348/301

(Continued)

FOREIGN PATENT DOCUMENTS

JP          63-128664         6/1988

(Continued)

*Primary Examiner*—Luong T. Nguyen
(74) *Attorney, Agent, or Firm*—Oblon, Spivak, McClelland, Maier & Neustadt, P.C.

(57) ABSTRACT

In a CMOS image sensor, current leakage after a series of noise removing operations has been completed is suppressed in a read operation for each horizontal line, thereby suppressing image noise occurring on the output display screen of the image sensor. There are provided signal storage regions for storing the signals read from the unit cells in the same row selected in the imaging area onto vertical signal lines and horizontal select transistors for sequentially selecting and reading the signals stored in the individual signal storage regions and transferring them to read horizontal signal lines. At least in the period during which the signals are read from the signal storage regions, one of the drain and source of the transistor electrically connected to the signal path between the vertical signal line and horizontal signal line is biased in the reverse direction with respect to the substrate region. Two adjacent ones of the horizontal select transistors form a pair. The horizontal select transistors in each pair share one of the source/drain regions so as to be connected to the horizontal signal line in common, and the others of the source/drain regions are connected to the vertical signal line individually.

3 Claims, 20 Drawing Sheets

| U.S. PATENT DOCUMENTS | | | FOREIGN PATENT DOCUMENTS | | |
|---|---|---|---|---|---|
| 5,187,583 A | 2/1993 | Hamasaki | JP | 2551658 | 8/1996 |
| 5,270,531 A | 12/1993 | Yonemoto | JP | 9-219504 | 8/1997 |
| 5,933,188 A | 8/1999 | Shinohara et al. | JP | 9-247538 | 9/1997 |
| 6,037,577 A | 3/2000 | Tanaka et al. | JP | 09-252434 | 9/1997 |
| 6,084,635 A * | 7/2000 | Nakamura ................. 348/302 | JP | 10-93069 | 4/1998 |
| 6,300,978 B1 | 10/2001 | Matsunaga et al. | | | |
| 6,512,543 B1 * | 1/2003 | Kuroda et al. .............. 348/302 | * cited by examiner | | |

FIG. 20 *PRIOR ART*

HIGH-SPEED SOLID-STATE IMAGING DEVICE CAPABLE OF SUPPRESSING IMAGE NOISE

This application is a divisional of and claims benefit under 35 USC 120 from U.S. application Ser. No. 09/322,994, filed Jun. 1, 1999, and is based upon and claims the benefit of priority under 35 USC 119 from Japanese Patent Applications 10-152805, 10-152807, both filed on Jun. 2, 1998 and 11-001139, filed on Jan. 6, 1999; the entire contents of which are incorporated by reference herein.

BACKGROUND OF THE INVENTION

This invention relates to a solid-state imaging device, and more particularly to a circuit for suppressing leakage current at the signal storage nodes of a CMOS solid-state image sensor (CMOS image sensor) with a read circuit capable of reading an image signal pixel by pixel, a circuit of suppressing the current drawn by an image signal amplifying source follower, and a horizontal readout gate providing a horizontal signal line with less parasitic capacitance, which are used in, for example, a video camera or an electronic still camera.

FIG. 20 shows an equivalent circuit of a conventional CMOS solid-state image sensor (amplification CMOS image sensor) (conventional equivalent 1) with a read circuit capable of reading an image signal pixel by pixel.

In the sensor of FIG. 20, a cell area (imaging area) 1 is composed of plural unit cells 13 arranged in a two-dimensional matrix. One unit cell corresponds to one pixel.

Each unit cell 13 is composed of, for example, four transistors and one photodiode. Specifically, each unit cell 13 includes a photodiode 8 to whose anode the ground potential is applied, a read transistor (shutter gate transistor) 14 one end of which is connected to the cathode of the photodiode 8, an amplifying transistor 15 whose gate is connected to the other end of the read transistor 14, a vertical select transistor 16 one end of which is connected to one end of the amplifying transistor 15, and a reset transistor 17 one end of which is connected to the gate of the amplifying transistor 15. In the cell area 1, the following lines are formed: read lines connected in common to the gates of the individual read transistors of the unit cells in the same rows, vertical select lines 6 connected in common to the gates of the individual read transistors 14 of the unit cells in the same rows, reset lines 7 connected in common to the gates of the individual reset transistors of the unit cells in the same rows, vertical signal lines 18-$i$ ($i$=1 to n) connected in common to the other end of the individual amplifying transistors 15 of the unit cells in the same columns, and power lines 9 connected in common to the other end of the individual reset transistors and to the other end of the individual vertical select transistors 16 of the unit cells in the same columns.

Outside the cell area 1, the following component parts are provided: load transistors 12 connected between one end of the respective vertical signal lines 18-$i$ and the ground nodes, horizontal select transistors 23-$i$ one end of which is connected to the other end of the respective vertical signal lines 18-$i$ via the corresponding noise chancellor circuits 25-$i$, a horizontal signal line 26 connected in common to the other end of the horizontal select transistors 23-$i$, an output amplifier circuit 27 connected to the horizontal signal line 26, a horizontal reset transistor 28 connected to the horizontal signal line 26, a vertical shift register 2 for supplying a select signal in a scanning manner to the vertical select lines 6 of each row in the cell area 1 and driving the vertical select transistors 16 in each row in a scanning manner, a horizontal register 3 for driving the horizontal select transistors 23-$i$ in a scanning manner, and a timing generator circuit 10 for generating various timing signals.

Each of the noise chancellor circuits 25-$i$ is composed of, for example, two transistors and two capacitors. Specifically, each noise chancellor circuit is composed of a sample hold transistor 19 one end of which is connected to the other end of the vertical signal line 18-$i$, a coupling capacitor 20 one end of which is connected to the other end of the sample hold transistor 19, a charge accumulation capacitor 21 connected between the other end of the coupling capacitor 20 and the ground node, and a potential clamping transistor 22 connected to the junction node of the capacitors 20, 21. One end of the corresponding one of the horizontal select transistors 23-$i$ is connected to the junction node of the capacitors 20, 21.

Each of the horizontal select transistors 23-$i$ is made up of an NMOS transistor having an active region (SDG region) formed in a p-well selectively formed at the surface of a semiconductor substrate. The p-well is connected to the ground potential.

FIG. 21 is a timing waveform diagram to help explain the operation of the solid-state image sensor of FIG. 20. Referring to FIG. 21, the operation of the solid-state image sensor of FIG. 20 will be explained.

The incident light on each photodiode 8 is converted photoelectrically and the resulting signal charges are accumulated in the photodiodes 8.

Before the operation of reading the signal charge, a high reset signal is applied to the reset line 7 for a specific period of time to reset the gate potential of the amplifying transistor 15. The reset transistor 17 is on for the specific period, resetting the gate potential of the amplifying transistor 15 to a desired potential.

At the same time, a high select signal is supplied to the vertical select line (address line) 6 selected in a scanning manner by the vertical shift transistor 2. The select signal from the vertical select line 6 turns on the vertical select transistor 16. The power supply line 9 supplies a voltage to the amplifying transistor 15 via the vertical select transistor 16. This causes the source-follower-connected amplifying transistor 15 to output a potential proportional to its gate potential to the corresponding vertical signal line 18-$i$.

There is a variation in the gate potential of the reset amplifying transistor 15. As a result, a variation appears in the reset potential of the vertical signal line 18-$i$ connected to the drain of the amplifying transistor 15.

To reset the variation in the reset potential of each vertical signal line 18-$i$, the sample hold transistor 19 is turned on after the reset transistor 17 has been turned on. As a result, the reset potential of the vertical signal line 18-$i$ is transmitted to the capacitor 21 via the capacitor 20. Thereafter, the potential clamping transistor 22 is kept on for a specific period, fixing the voltage of the junction node of the capacitors 20, 21 at a constant level.

Next, the read line 4 corresponding to the desired row is selected (or supplied with a high read signal), turning on the read transistor 14. This causes the accumulated charge in the photodiode 8 to be transferred to the gate of the amplifying transistor 15 via the read transistor 14, which changes the gate potential. The amplifying transistor 15 outputs a voltage signal proportional to the amount of change of the gate potential to the corresponding vertical signal line 18-$i$.

As a result, the change in the voltage signal on the vertical signal line 18-$i$ caused by the read operation after resetting has been transferred to the capacitor 21 via the capacitor 20. This removes the noise introduced in the stages before the noise chancellor circuit 25-*i*, such as variations in the reset potential of each vertical signal line 18-*i* occurring in the cell area 1.

After the noise removing operations have been carried out, the sample hold transistor 19 is turned off and the vertical select transistor 16 is also turned off. As a result, the unit cell 13 is brought into the unselected state and the cell area 1 is electrically disconnected from each noise chancellor circuit 25-*i*.

Then, the horizontal reset transistor 28 is turned on, which resets the horizontal signal line 26. Thereafter, the horizontal select transistors 23-*i* are turned on sequentially, causing the voltages at the junction nodes (signal storage nodes SN) of the capacitors 20, 21 to be read sequentially. The read-out voltages are amplified by the output amplifier circuit 27, which then outputs the amplified voltages.

The above-described noise removing operations are carried out each time one horizontal line is read from.

In the prior art, after the series of noise removing operations has been completed, the vertical select line 6 is returned to the low level, turning off the vertical select transistor 16. As a result, the voltage of the vertical signal line 18-*i* drops to the ground potential via the load transistor 12. At this time, since one end of the vertical signal line 18-*i* of the sample hold transistor 19 is biased at the same voltage as that of the substrate (e.g., the p-well) in the noise chancellor circuit 25-*i*, as much leakage current as cannot be neglected develops. The leakage current changes the voltage at the signal storage node SN.

In this case, the leakage currents in the individual sample hold transistors 19 differ from one another. This permits the amount of change of the voltage at the signal storage node SN to differ with the leakage current.

Thereafter, the horizontal select transistors 23-*i* are tuned on sequentially and the signal is read from each horizontal select transistor 23-*i*. Since the direct-current potentials of the read-out signals differ from each other, image noise, such as vertical lines, takes place due to the variations in the direct-current potential when the output signal of the image sensor is displayed on the screen of the image display unit.

Additionally, in the prior art, the potentials of the signal storage nodes SN are clamped in the noise chancellor circuits 25-*i*, the potentials are clamped at the ground potential by the clamp transistors 22. One end of the clamp transistors 22 and that of the horizontal select transistors 23-*i* connected to the signal storage nodes SNs are biased at the same voltage as that of the substrate (the p-well in the example). This permits as much leakage current as cannot be neglected to take place at those transistors.

As a result, when the horizontal select transistors 23-*i* are turned on sequentially, the direct-current potentials of the signals of the horizontal select transistors 23-*i* later selected vary from the direct-current potential of the signal read from the horizontal select transistors 23-*i* earlier selected (for example, the former get lower gradually). As a result, image noise, such as vertical lines, occurs.

FIG. 22 shows an equivalent circuit of another conventional amplification CMOS image sensor (conventional equivalent 2).

In FIG. 22, in a cell area (imaging area) 1, unit cells 13 are arranged in a two-dimensional matrix. Like the unit cell 13 of FIG. 20, each unit cell 13 in conventional equivalent 2 is composed of a vertical select transistor (row select transistor) Ta, an amplifying transistor Tb, a reset transistor Tc, a read transistor Td, and a photodiode PD. One pixel is made up of one unit cell 13.

As in FIG. 22, read lines 4, vertical select lines 6, reset lines 7, vertical signal/lines VLIN, and power supply lines 9 are formed in the cell area 1.

As in FIG. 22, a load transistor TL is connected between one end of the vertical signal lines VLIN and the ground node outside the lower part of the cell area 1.

Like the noise chancellor circuits 25-*i* of FIG. 20, noise chancellor circuits 25 are arranged in the horizontal direction outside the upper part of the cell area 1. Each noise chancellor circuit is composed of a sample hold transistor TSH, a potential clamping transistor TCLP, a coupling capacitor Cc, and a charge accumulation capacitor Ct. A horizontal select transistor TH one end of which is connected to the junction node of the capacitor Cc and capacitor Ct is provided for each noise chancellor circuit.

A horizontal signal line HLIN is connected in common to the other end of each of the horizontal select transistors TH. A horizontal reset transistor (now shown) and an output amplifier circuit (not shown) are connected to the horizontal signal line HLIN.

Furthermore, outside the cell area 1, the following are provided: a vertical shift register 2 for selecting the vertical select transistors Ta in each row in a scanning manner, a horizontal shift register 3 for driving the horizontal select transistors TH in a scanning manner, a timing generator circuit for generating various timing signals to be supplied to, for example, the noise chancellor circuit 25, a bias generator circuit 11 for supplying a specific bias potential to one end of the potential clamping transistor TCLP of the noise chancellor circuit 25, and a pulse selector 2*a* for driving the individual rows in the cell area 1 in a scanning manner under the control of the output pulse from the vertical shift register 2.

In FIG. 22, the amplifying transistor Tb of each unit cell 13 and the load transistor TL connected to the amplifying transistor Tb via the vertical signal line VLIN constitute a source follower amplifier circuit.

The operation of the solid-state image sensor of FIG. 22 is basically the same as that of the solid-state image sensor of FIG. 20 except for operation timing.

FIG. 23 is a timing waveform diagram to help explain the operation of the solid-state image sensor of FIG. 22.

In each unit cell 13, incident light on the photodiode PD is converted photoelectrically. The resulting signal charges are accumulated within the photodiode PD.

To read the signal charges in the photodiodes PD from the unit cells 13 in a row (hereinafter, referred to as a selected row) in the horizontal retrace line interval, the signal (φ ADRES pulse) to the vertical select line 6 for the selected row is turned on, turning on the row select transistors Ta in the selected row, to select each of the vertical signal lines VLIN.

This causes the source follower circuit composed of the amplifying transistor Tb supplied with the power-supply potential VDD via the row select transistor Ta and the load transistor TL to operate in the individual unit cells 13 in the selected row.

Next, in each unit cell in the selected row, the signal (φ RESET pulse) to the reset line 7 is turned on to reset the gate voltage of the amplifying transistor Tb to a reference voltage, thereby outputting the reference voltage to the vertical signal line VLIN.

In this case, the driving signal (φ SH pulse) of the sample hold transistor TSH in the noise chancellor circuit 25 is turned on in advance (for example, at the same time the φ ADRES pulse is turned on). After the reference voltage has been outputted to the vertical signal line VLIN, the driving signal (φ CLP pulse) of the potential clamping transistor TCLP is kept on for a specific period of time, which sets the reference voltage in the noise chancellor circuit 25.

Next, after the φRESET pulse has been turned off, the signal (φ READ pulse) on the read line 4 is turned on. This turns on the read transistor Td, supplying a voltage proportional to the accumulated charges in the photodiode PD to the gate of the amplifying transistor Tb. As a result, the signal voltage proportional to the accumulated charges is outputted to the vertical signal line VLIN and noise chancellor circuit 25.

Thereafter, the φ SH pulse in the noise chancellor circuit 25 is turned off, which allows the signal component (noise-removed signal voltage) corresponding to the difference between the reference voltage and the read-out signal voltage to be accumulated in the charge accumulating capacitor Ct even in the effective horizontal scanning period.

Then, after the cell area 1 has been electrically separated from each noise chancellor circuit 25, the signal voltage accumulated in the capacitor Ct turns off φ ADRES pulse in the effective scanning period, turning off the vertical select transistor Ta, which places the unit cells 13 in the selected row in the unselected state. Thereafter, sequentially turning on the driving signals (φ H pulse) for the horizontal select transistors TH causes the horizontal select transistors TH to turn on in sequence, allowing the signal voltage accumulated on the horizontal signal line HLIN to be outputted.

In the operation, the voltage VVLIN of the vertical signal line VLIN becomes the operating voltage Vm (about 1.5V) of the source follower circuit in the horizontal retrace line interval, whereas it becomes 0V in the effective horizontal scanning period. This permits leakage current from the sample hold transistors TSH to occur in the effective horizontal scanning period and enter the capacitors of the noise chancellor circuit 25. The leakage current differs from one vertical line to another, which causes image noise, such as vertical lines.

As described above, the conventional CMOS image sensors have the problem of permitting image noise, such as vertical lines, to appear on the display screen of the image sensor output signal as a result of changes in the voltage at the signal storage node caused by the current leakage after a series of noise removing operations has been completed by the noise chancellor circuit in a read operation for each horizontal line.

FIG. 25 shows patters of part of the horizontal readout gate section of the conventional CMOS image sensor of FIG. 20.

In FIG. 25, reference symbol 23a-i (i=1 to 4) indicates the active region (SDG region) of the horizontal select transistor 23-i formed in a p-well selectively formed at the surface of a semiconductor substrate. Element isolating regions 24 are formed between SDG regions.

Reference symbol 23b-i indicates the gate electrode (polysilicon wire) of the horizontal select transistor 23-i. The gate electrode is formed on the channel of the SDG region 23a-i via a gate insulation film (not shown) formed at the surface of the p-well.

A metal wire (normally an aluminum wire) corresponding to the vertical signal line 18-i is connected to the n-type diffused region (source) at one end of the SDG region 23a-i. To the n-type diffused region (drain) at the other end, a metal wire (normally an aluminum wire) corresponding to the horizontal signal line 26 is connected.

Since the coupling capacitance with the p-well is present in the n-type diffused regions acting as the drain and source of the horizontal select transistor 23-i, the parasitic capacitance 29 on the horizontal signal line 26 increases in proportion to the number of the horizontal select transistors 231-i.

The increase in the parasitic capacitance on the horizontal signal line 26 makes the operating speed of the circuit slower. Switching noise developing as a result of the switching operation of the horizontal select transistor 23-i is not removed by the noise chancellor circuit 25-i and enters the parasitic capacitance 29. The amount of incoming noise becomes larger as the parasitic capacitance increases. The larger amount of incoming noise contributes the occurrence of image noise, such as vertical lines when the output signal of the solid-state image sensor is displayed on the screen of the image display unit.

As described above, the conventional solid-state image sensor has the problem of making the circuit operation speed slower because the parasitic capacitance of the horizontal signal line increases in proportion to the number of horizontal select transistors and of permitting image noise, such as vertical lines, to appear on the display screen of the output signal from the image sensor as a result of noise entering the parasitic capacitance.

BRIEF SUMMARY OF THE INVENTION

Accordingly, objects of the present invention is to solve the problems described above.

According to the present invention, there is provided a solid-state imaging device capable of suppressing not only current leakage occurred after a series of noise removing operations by noise chancellor circuits has been completed in a read operation for each horizontal line, but also image noise, such as vertical lines, appearing on the display screen of the output signal of an image sensor.

Furthermore, according to the present invention, there is provided a solid-state imaging device capable of reducing the parasitic capacitance at the horizontal signal lines dependent on the number of horizontal select transistors to speed up the circuit operation and decreasing the amount of noise entering the parasitic capacitance to suppress image noise, such as vertical lines, appearing on the display screen of the output signal of the image sensor because of the incoming noise.

Specifically, according to a first aspect of the present invention, there is provided a solid-state imaging device comprising: an imaging area including units cells arranged in a two-dimensional matrix on a semiconductor substrate and vertical signal lines each connected in common to the unit cells in the same row, each unit cell comprising: a photoelectric conversion element for generating charges in proportion to incident light; a read circuit for reading a voltage corresponding to the generated charges, an amplifier circuit for amplifying the read-out voltage; a reset circuit for resetting the generated charges; and a row select circuit for allowing the output signal of the amplifier circuit to be output onto the vertical signal line; load transistors each being connected to corresponding one of the vertical signal lines at one end; a load transistor on/off circuit for controlling the load transistors in a manner such that the load transistors are turned off when the row select circuit is in the off state; and signal storage circuits each being connected to corresponding one of the vertical signal lines at the other end, for storing a signal output onto corresponding one of the vertical signal lines, wherein: a bias voltage is applied to the vertical signal lines after the load transistor on/off control circuit has turned off the load transistors.

According to a second aspect of the present invention, there is provided a solid-state imaging device comprising: an imaging area including:

unit cells arranged in a two-dimensional matrix on a semiconductor substrate, each unit cell having a photoelectric conversion element; vertical signal lines each being connected in common to unit cells in the same column; and vertical select lines each being connected in common to unit cells in the same row, for selecting the unit cells in the same row; a driving circuit for selectively driving the vertical select lines; load transistors each being connected to corresponding one of the vertical signal lines at one end; signal storage regions each being connected to corresponding one of the vertical signal lines at the other end, for storing a signal readout on the corresponding one of the vertical signal lines; a horizontal signal line onto which signals stored in the signal storage regions are sequentially transferred; transistors each being connected to a signal path arranged between corresponding one of the vertical signal lines and the horizontal signal line and a bias voltage control circuit for biasing one of the drain and source of each of the transistors in the reverse direction with respect to the substrate region at least in a period during which the signals are transferred sequentially from the signal storage regions to the horizontal signal line.

According to a third aspect of the present invention, there is provided A solid-state imaging device comprising: an imaging area provided by arranging unit cells each including a photoelectric conversion element in a two-dimensional matrix on a semiconductor substrate; a row select circuit for selecting unit cells in the same row in the imaging area; vertical signal lines onto which signals read out from the unit cells in the same row selected by the row select circuit are transferred; a horizontal readout gate section for sequentially selecting the signals transferred onto the vertical signal lines, the horizontal readout gate section comprising: horizontal select transistors each being connected to corresponding one of the vertical signal lines, in which two adjacent ones of the horizontal select transistors form a plurality of pairs, each pair having a drain region commonly shared by the two adjacent transistors and connected to the horizontal signal line, and two source regions being arranged to sandwich the shared drain region; and a pair of correction transistors having a drain regions and source regions arranged in the same manner as each of the pairs, wherein when one transistor of a selected one of the pairs is driven, the pair of correction transistors are driven in a complementary manner with respect to the pair of horizontal select transistors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained in detail.

Most part of an amplification CMOS image sensor according to the present invention is equal to a conventional amplification CMOS image sensor, except that the former is so improved that the potential of the horizontal signal line 18-$i$ after a series of noise removing operations by the noise chancellor circuit 25-$i$ has been completed is prevented from dropping to the ground potential in a read operation for each horizontal line.

FIRST EMBODIMENT

Figure 1:
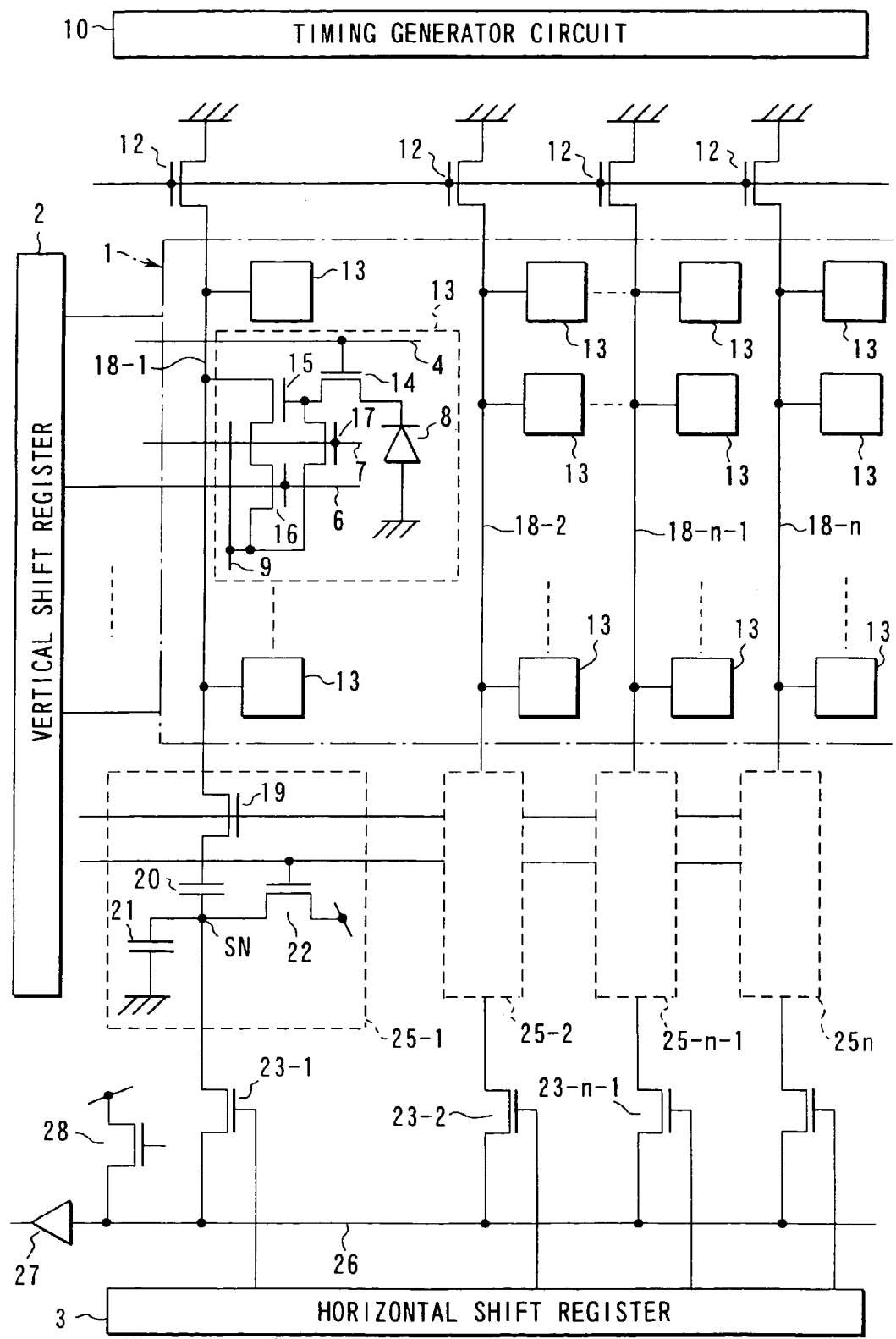
FIG. 1 shows an equivalent circuit of a CMOS image sensor according to a first embodiment of the present invention.
Figure 20:
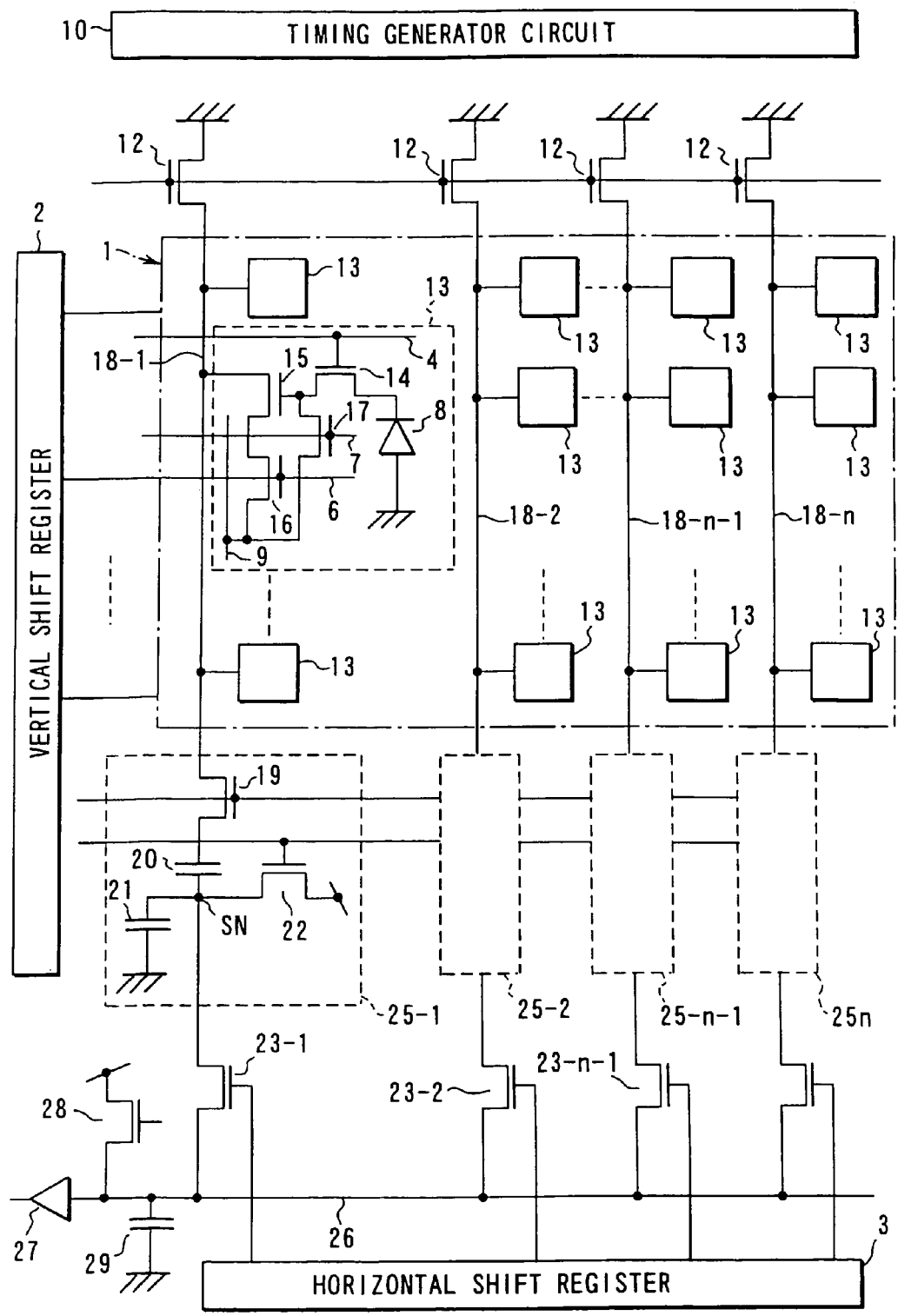
FIG. 20 is an equivalent circuit diagram of a conventional amplification CMOS image sensor (conventional equivalent 1) with a read circuit capable of reading a pixel signal pixel by pixel.

FIG. 1 shows an equivalent circuit of an amplification CMOS image sensor according to a first embodiment of the present invention. The CMOS image sensor of FIG. 1 differs from the CMOS image sensor of conventional equivalent 1 explained in FIG. 20 in the method of driving the vertical select transistor 16 after a series of noise removing operations by the noise chancellor circuits 25-$i$ has been completed in a read operation for each horizontal line in the horizontal retrace line interval. In the other respects, the former is the same as the latter. In FIG. 1, the same parts as those in FIG. 20 are indicated by the same reference symbols.

Specifically, in FIG. 1, in a cell area (imaging area) 1, unit cells 13 are arranged in a two-dimensional matrix. Each unit cell 13 is composed of a photodiode (photoelectric conversion element) 8, a read transistor (reading means) 14, an amplifying transistor (amplifying means) 15, a vertical select transistor (row select means) 16, and a reset transistor (reset means) 17. In addition, read lines 4, vertical select lines 6, reset lines 7, vertical signal lines 18-$i$ (i=1 to n), and power supply lines 9 are formed in the cell area.

Furthermore, outside the cell area 1, the following are provided: load transistors 12, noise chancellor circuits (signal storage regions) 25-$i$, horizontal select transistors 23-$i$, a horizontal signal line 26, an output amplifier circuit 27, a horizontal reset transistor 28, a vertical shift register 2, a horizontal shift register 3, and a timing generator circuit 10.

Each of the noise chancellor circuits 25-$i$ is made up of a sample hold transistor 19, a coupling capacitor 20, a charge accumulation capacitor 21, and a potential clamping transistor 22. One end of the corresponding one of the horizontal select transistors 23-$i$ is connected to the junction node of the capacitors 20, 21.

Additionally, there is provided a driving circuit (not shown). The driving circuit uses the output of the vertical shift register 2 and the output of the timing generator circuit 10 to produce various driving pulses as shown in FIG. 2 and supplies the driving pulses to the read lines 4, vertical lines 6, reset lines 7, load transistors 12, sample hold transistors 19, and potential clamping transistors 22.

Figure 2:
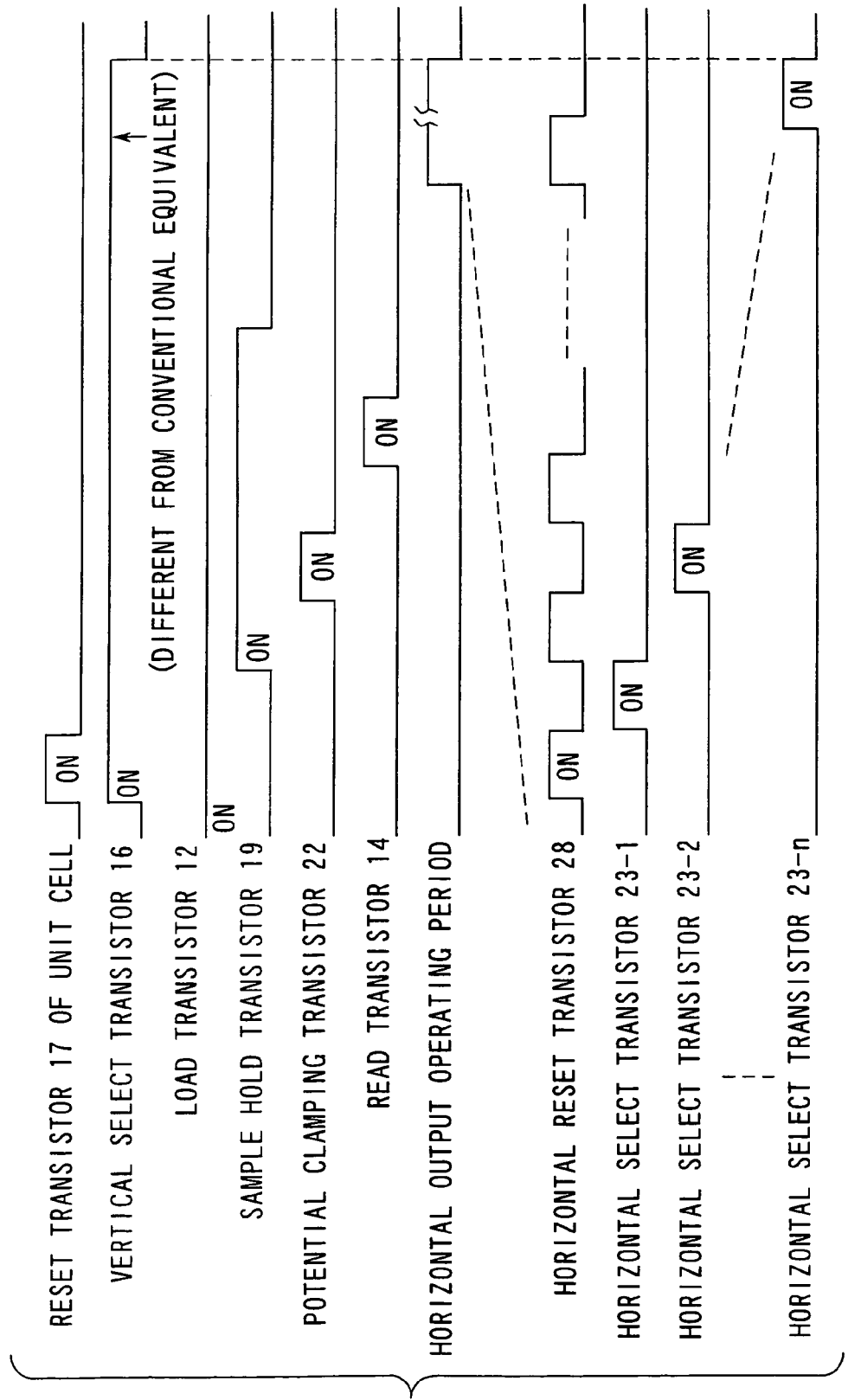
FIG. 2 is a timing waveform diagram to explain an example of the operation of the CMOS image sensor of FIG. 1.

FIG. 2 is a timing waveform diagram to help explain an example of the operation of the CMOS image sensor of FIG. 1.

Figure 21:
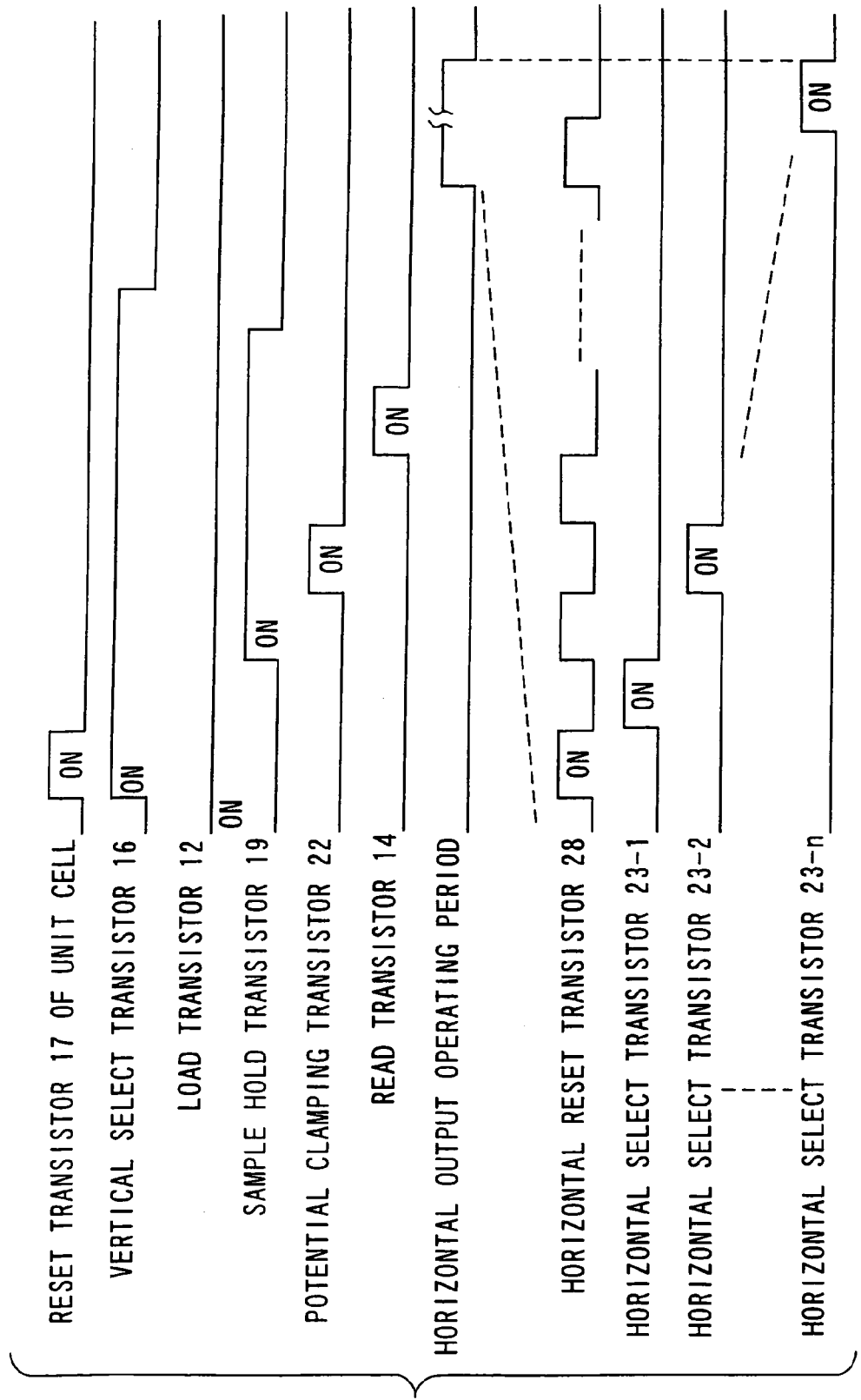
FIG. 21 is a timing waveform diagram to help explain an example of the operation of the solid-state image sensor of FIG. 20.

The operation of the CMOS image sensor of FIG. 1 is the same as that of the CMOS image sensor of conventional equivalent 1 in FIG. 20 (refer to FIG. 21), except that the driving signal for the vertical select line 6 selected in a read operation for each horizontal line in the horizontal retrace line interval is kept active (in this example, high) even in a period (effective horizontal scanning period) during which the signals stored at the signal storage nodes SN of the individual noise chancellor circuits 25-$i$ are selected and read sequentially by the horizontal select transistors.

Specifically, in a read operation for each horizontal line, after a series of noise removing operations have been completed, the sample hold transistor 19 is turned off, which electrically separates the cell area 1 from the corresponding noise chancellor circuit 25-$i$.

Then, the horizontal reset transistor 28 is turned on, resetting the potential of the horizontal signal line 2. Thereafter, the horizontal select transistors 23-$i$ are turned on sequentially, allowing the voltages at the junction nodes of the capacitors 20, 21 (signal storage nodes SN) to be read sequentially. The output amplifier circuit 27 amplifies the voltages and outputs them.

In the first embodiment, even after the noise removing operations have been completed, the vertical select transistor 16 is kept on by the high vertical select line 6 in the selected row. This prevents the voltage on the vertical signal line 18-$i$ from dropping to the ground potential via the corresponding load transistor 12. In this case, the amplifying transistor 15 in the corresponding unit cell 13 and the load transistor 12 connected via the vertical signal line 18-$i$ to the amplifying transistor 15 constitute a source follower amplifier circuit. The voltage on the vertical signal line 18-$i$ is the operating voltage Vm (about 1V to 1.5V) of the source follower amplifier circuit.

As a result, in the sample hold transistor 19 of the noise chancellor circuit 25-$i$ connected to the signal path between the vertical signal line 18-$i$ and the horizontal signal line 26, one end of the vertical signal line 18-$i$ is biased in the reverse direction with respect to the substrate region (in the embodiment, p-well=0V).

Consequently, leakage current from the sample hold transistor 19 is suppressed. This suppresses a drop in the voltage at the signal storage node SN caused by the leakage current, which suppresses variations in the degree of voltage drop at the signal storage node SN according to variations in the leakage current in each sample hold transistor 19.

As a result, when the horizontal select transistors 23-$i$ are turned on sequentially and the signals are read from the individual horizontal select transistors 23-$i$, image noise, such as vertical lines, due to variations in the direct-current potential of each signal is prevented from occurring when the output signal from the image sensor is displayed on the screen.

MODIFICATION 1 OF FIRST EMBODIMENT

Figure 23:
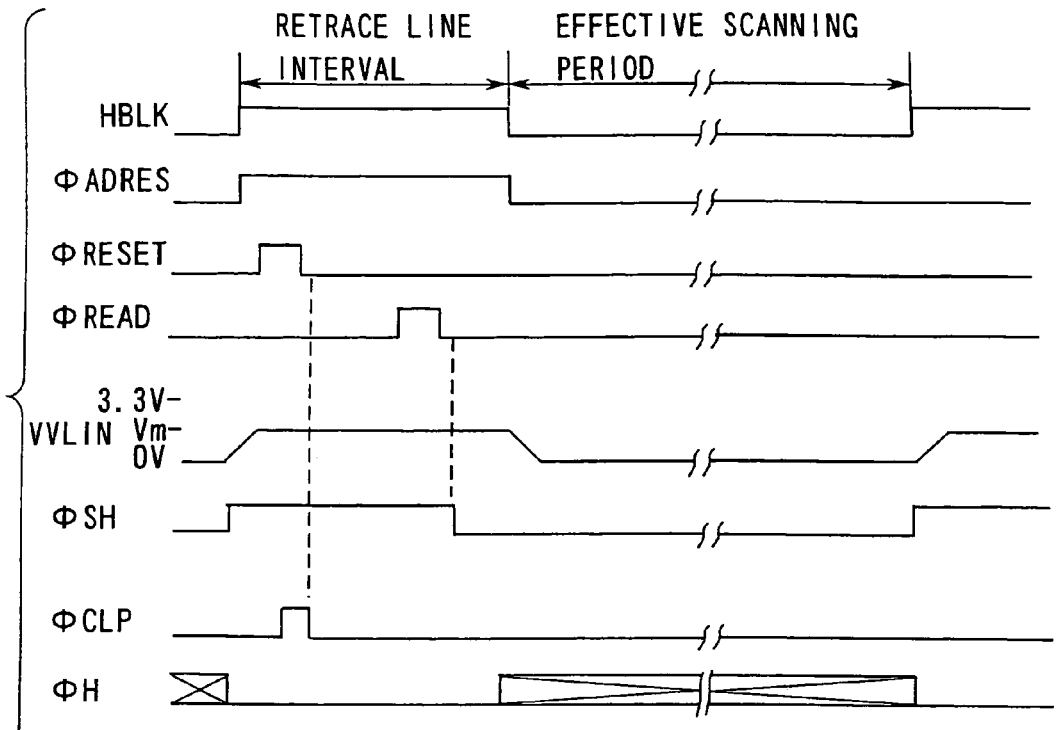
FIG. 23 is a timing waveform diagram to help explain an example of the operation of the solid-state image sensor of FIG. 22.
Figure 24:
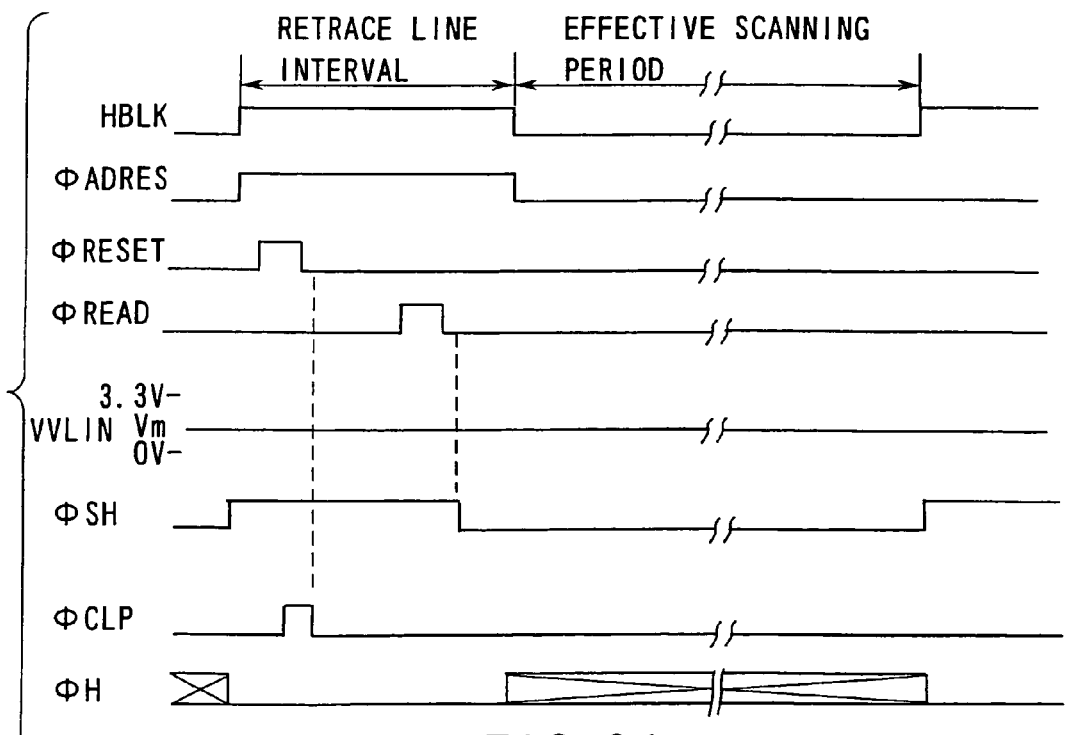
FIG. 24 shows a timing waveform diagram to explain the operation when part of the configuration of the solid-state image sensor of FIG. 22 is changed as a modification of the present invention.
Figure 25:
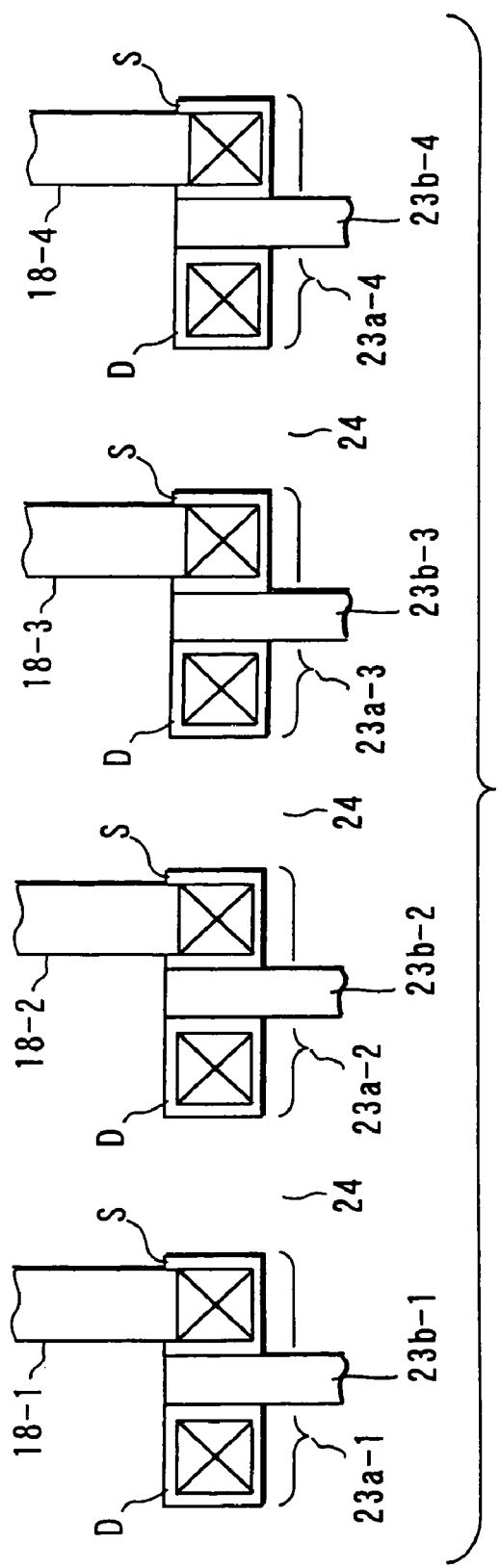
FIG. 25 shows a pattern of part of the horizontal readout gate section of the CMOS image sensor of FIG. 20.

Like the operation timing of FIG. 23 in conventional equivalent 2, the operation timing of FIG. 2 may be so changed that the vertical transistor 16 is turned on and the sample hold transistor 19 is turned on to maintain the potential on the vertical signal line 18-$i$, and thereafter the reset transistor 17 is turned on temporarily.

MODIFICATION 2 OF FIRST EMBODIMENT

A COMO image sensor according to modification 2 of the first embodiment is the same as the CMOS image sensor of the first embodiment, except that at least the clamp potential of the potential clamping transistor 22 connected to the signal storage node SN of the noise chancellor circuit 25-$i$ and the reset potential of the horizontal reset transistor 28 connected to the horizontal signal line 26 are set to, for example, about 1V in a period during which horizontal select transistors 23-$i$ select and read sequentially the signals stored at the signal storage nodes SN of the individual noise chancellor circuits 25-$i$.

With such a configuration, after the noise removing operations have been completed, one end of the clamping potential side of the potential clamping transistor 22 is biased in the reverse direction with respect to the substrate region (in the embodiment, p-well=0V), which suppresses the leakage current. This suppresses a voltage drop at the signal storage node SN due to the leakage current.

Furthermore, since the horizontal signal line 26 is at about 1V after the resetting operation of the horizontal reset transistor 28 has been completed, one end of the horizontal signal line side of the horizontal select transistor 23-$i$ is biased in the reverse direction with respect to the substrate region (in the example, p-well=0V), which suppresses the leakage current. This suppresses a voltage drop at the signal storage nodes SN due to the leakage current.

In addition, after the resetting operation of the horizontal reset transistor 28 has been completed, one end of the reset power supply side of the horizontal reset transistor 28 is biased in the reverse direction with respect to the substrate region (in the embodiment, p-well=0V), which suppresses the leakage current. This suppresses a voltage drop at the horizontal signal line 26 due to the leakage current.

Consequently, image noise, such as vertical lines, occurring when the output signal from the image sensor is displayed on the screen of the image display unit is suppressed more than in the first embodiment.

In the first embodiment, the source follower amplifier circuit is always in operation, leading to an increase in the power consumption. An embodiment of the present invention which solve this problem will be explained below.

SECOND EMBODIMENT

Figure 3:
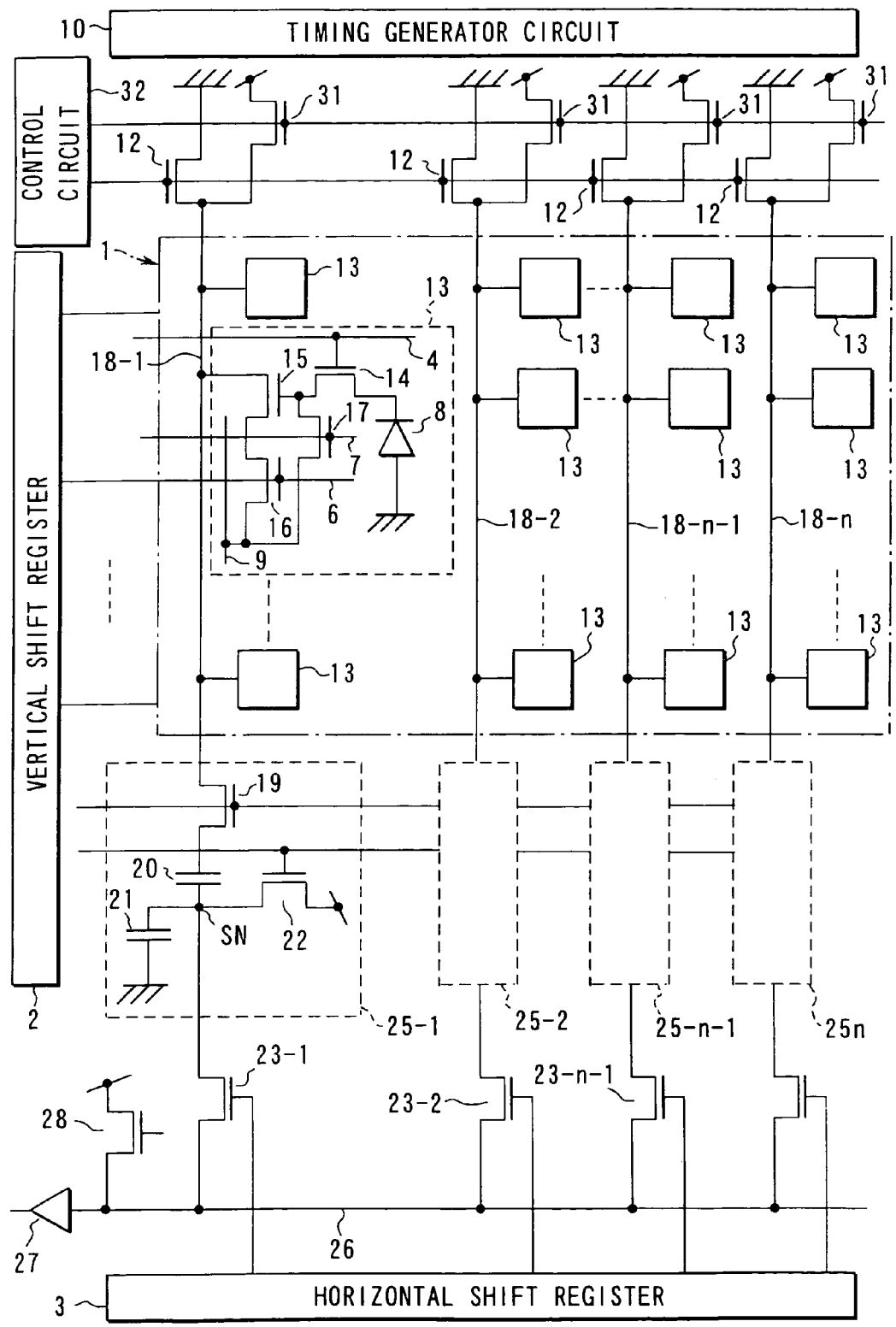
FIG. 3 shows an equivalent circuit of a CMOS image sensor according to a second embodiment of the present invention.

FIG. 3 shows an equivalent circuit of a CMOS image sensor according to a second embodiment of the present invention.

The image sensor of FIG. 3 is the same as the CMOS image sensor of conventional equivalent 1 in FIG. 20, except that bias applying transistors 31 and an on/off control circuit 32 are added. The bias applying transistors 31 are connected between the respective vertical signal lines 18-$i$ and bias voltage nodes to set at a desired bias potential (e.g., about 1V) the voltages on the vertical signal lines 18-$i$ after a series of noise removing operations by the noise chancellor circuits 25-$i$ has been completed in a read operation for each horizontal line. The on/off control circuit 32 not only turns off the load transistors 12 of the vertical signal lines 18-$i$, but also turns on the bias applying transistors 31 after a series of noise removing operations has been completed. In FIG. 3, the same parts as those of FIG. 20 are indicated by the same reference symbols and an detailed explanation of them will not be given.

Figure 4:
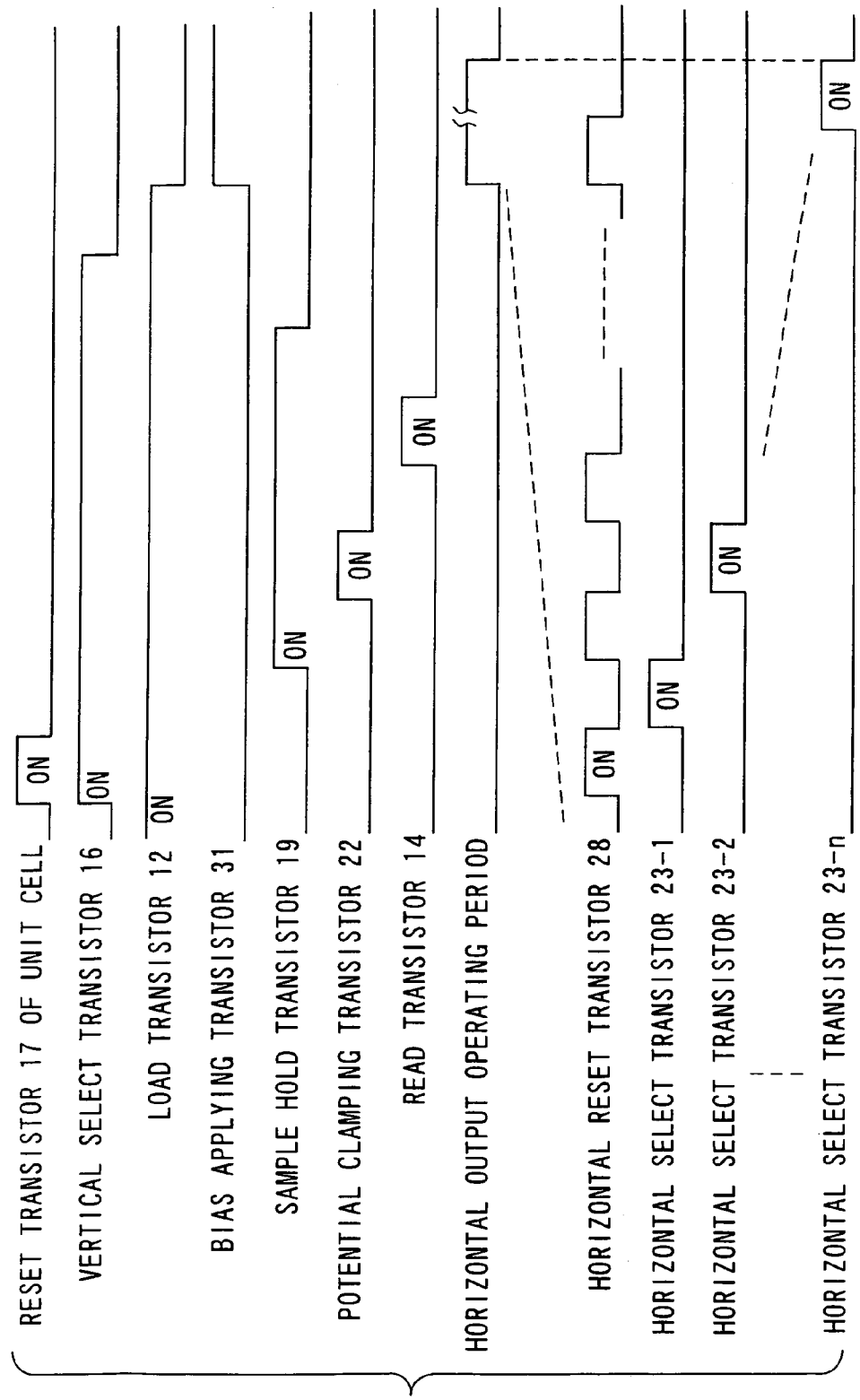
FIG. 4 is a timing waveform diagram to explain an example of the operation of the CMOS image sensor of FIG. 3.

FIG. 4 is a timing waveform diagram to help explain an example of the operation of the CMOS image sensor of FIG. 3.

The operation of the CMOS image sensor of FIG. 3 is the same as that (refer to FIG. 21) of the CMOS image sensor of conventional equivalent 1 in FIG. 20, except that the load transistor 12 is turned off and the bias applying transistor 31 is turned on in at least a period during which the signals stored at the signal storage nodes SN of the individual noise chancellor circuits 25-$i$ are selected and read sequentially by the horizontal select transistors 23-$i$ in a read operation for each horizontal line.

As with the CMOS image sensor of the first embodiment, with the COMS image sensor of the second embodiment, the voltage on the vertical signal line 18-$i$ is prevented from dropping to the ground potential via the load transistor 12 after a series of noise removing operations has been completed in a read operation for each horizontal line. In addition to this, the bias applying transistor 31 sets the voltage on the vertical signal line 18-$i$ at a desired voltage, for example, about 1V.

Consequently, one end of the vertical signal line 18-$i$ of the sample hold transistor 19 is biased in the reverse direction with respect to the substrate region (in the example, p-well=0V), which suppresses the leakage current. This suppresses image noise.

THIRD EMBODIMENT

Figure 5:
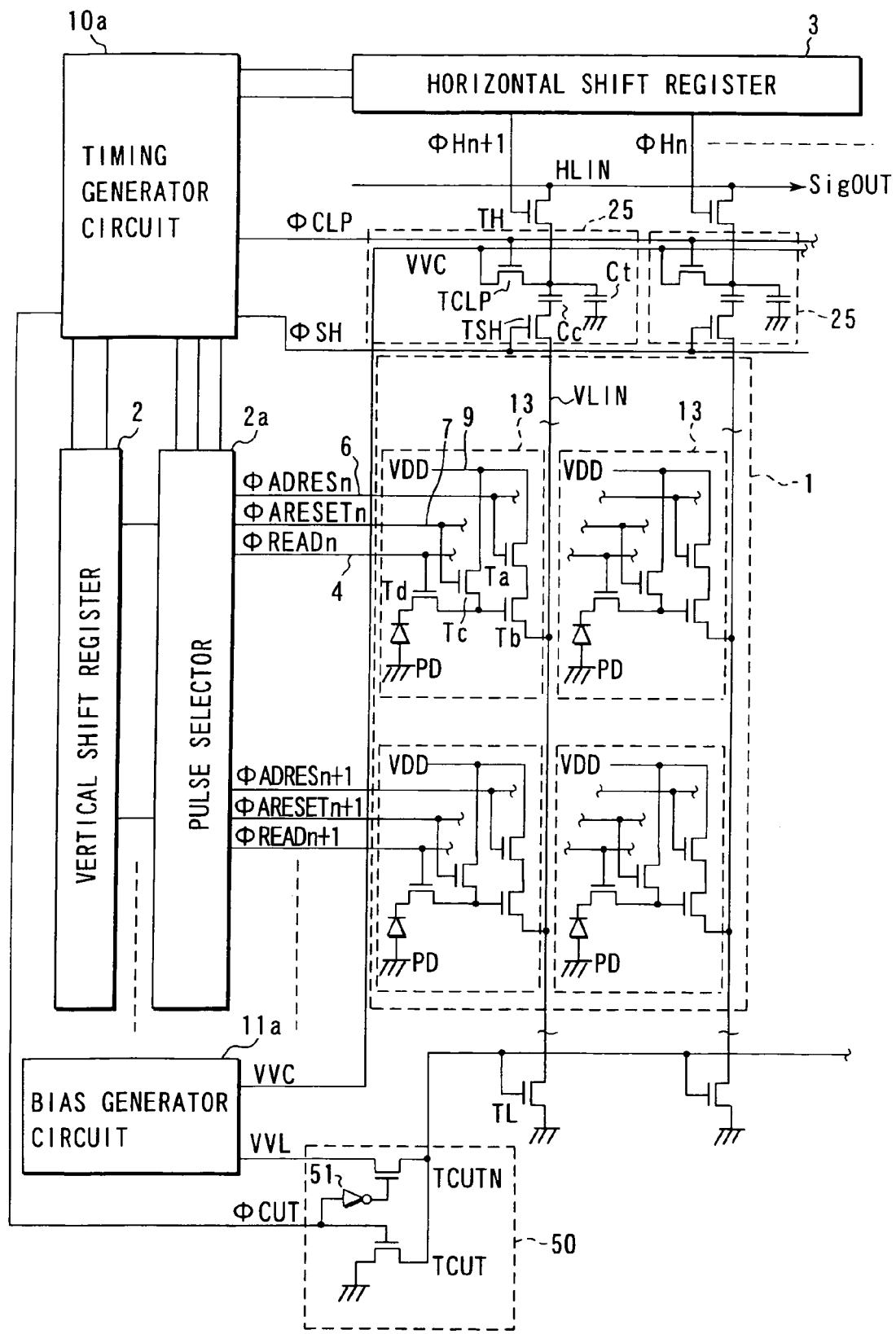
FIG. 5 shows an equivalent circuit of a CMOS image sensor according to a third embodiment of the present invention.

FIG. 5 shows an equivalent circuit of a CMOS image sensor according to a third embodiment of the present invention.

Figure 22:
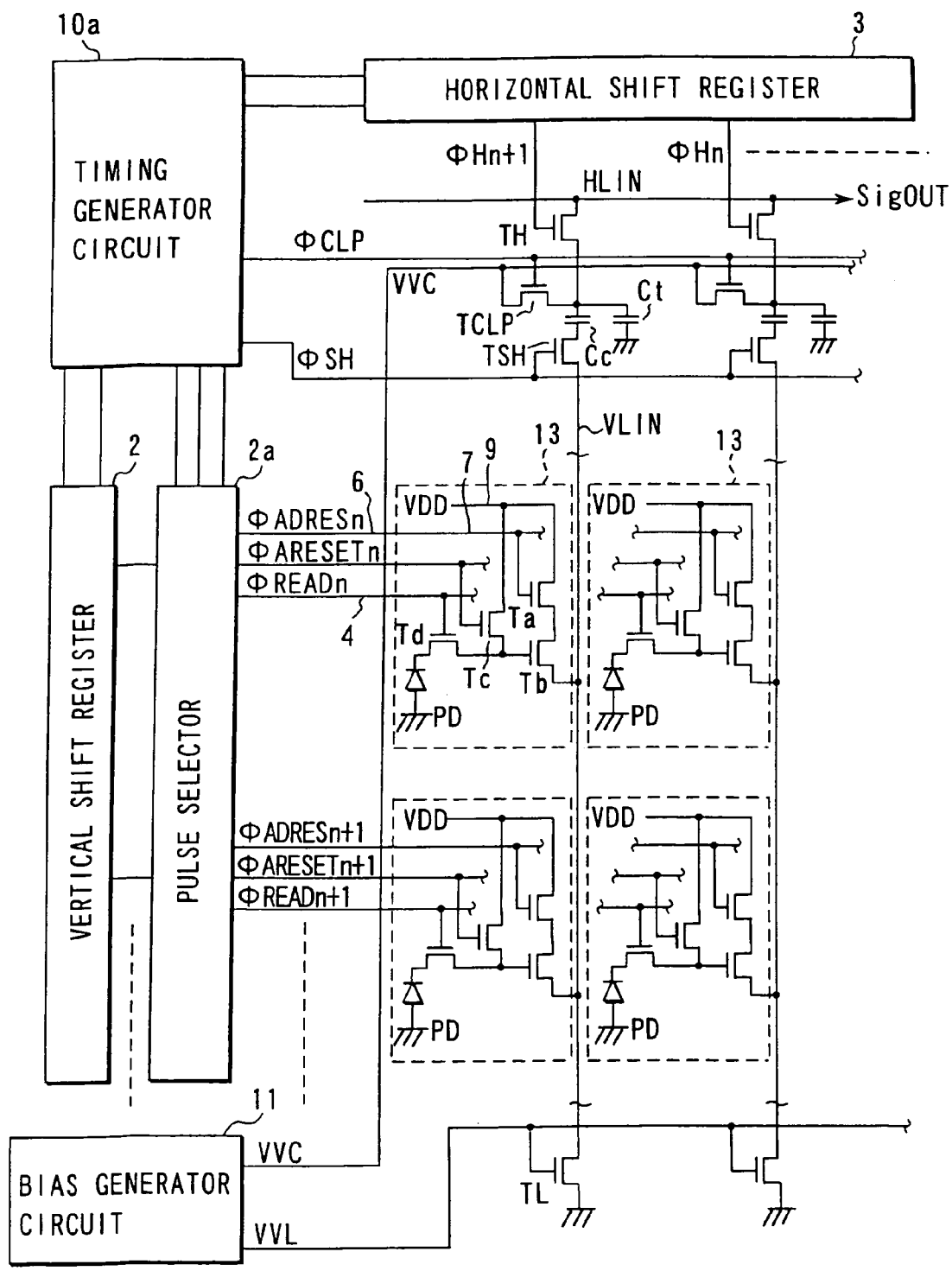
FIG. 22 is an equivalent circuit diagram of a conventional amplification CMOS image sensor (conventional equivalent 2)

The image sensor of FIG. 5 is the same as the CMOS image sensor of conventional equivalent 2 of FIG. 22, except that there is provided a load transistor on/off control circuit 50 (source follower control switch circuit) which not only turns off the load transistor TL of the vertical signal line VLIN but also brings the vertical signal line VLIN to a specific bias voltage (e.g., power supply voltage VDD=about 3.3V) after a series of noise removing operation has been completed, and that the configuration of the pulse selector (driving circuit) 2a, that of the timing generator circuit 10, and that of the bias generator circuit 11a differ from those of conventional equivalent 2.

Specifically, in FIG. 5, unit cells 13 are arranged in the cell area (imaging area) 1 in a two-dimensional matrix. Each unit cell 13 is composed of a vertical select transistor (row select transistor or row select means) Ta, an amplifying transistor (amplifying means) Tb, a reset transistor (reset means) Tc, a read transistor (read means) Td, and a photodiode (photoelectric conversion means) PD. In addition, read lines 4, vertical select lines 6, reset lines 7, vertical signal lines VLIN, and power supply lines are formed in the cell area 1.

Outside the cell area 1, the following are provided: load transistors TL, noise chancellor circuits (signal storage regions) 25, horizontal select transistor TH, horizontal signal lines HLIN, horizontal reset transistors (not shown), output amplifier circuits (not shown), a vertical shift register 2, a pulse selector (driving circuit) 2a, a horizontal shift register 3, a timing generator circuit 10a, and a bias generator circuit (bias applying means) 11a.

Each of the noise chancellor circuits 25 is composed of a sample hold transistor TSH, a potential clamping transistor TCLP, a coupling capacitor Cc, and a charge accumulating capacitor Ct. One end of the horizontal select transistor TH is connected to the junction node of the capacitor Cc and capacitor Ct.

The pulse selector (driving circuit) 2a drives the individual rows in the cell area 1 under the control of the output pulse of the vertical shift register 2.

The bias generator circuit 11a generates a bias potential VVC to be supplied to one end of the potential clamping transistor TCLP of each noise chancellor circuit 25 and a bias potential VVL to be supplied to the on/off control circuit 50.

The on/off control circuit 50 includes the following: (1) a load cutting transistor TCUT connected between the gate of the load transistor TL and the ground node in each source follower circuit; (2) a bias applying transistor TCUTN connected between the gate of the load transistor TL in each source follower circuit and the bias voltage (VVL) output node of the bias generator circuit 11a; and (3) a circuit for controlling the operation of the bias applying transistor TCUTN complementarily with respect to the load cutting transistor TCUT by applying the source follower control signal (φ CUT pulse) outputted with specific timing from the timing generator circuit 10a to the gate of the load cutting transistor TCUT and then applying the pulse signal obtained by inverting the φ CUT pulse at the inverter circuit 51 to the gate of the bias applying transistor TCUTN.

Figure 6:
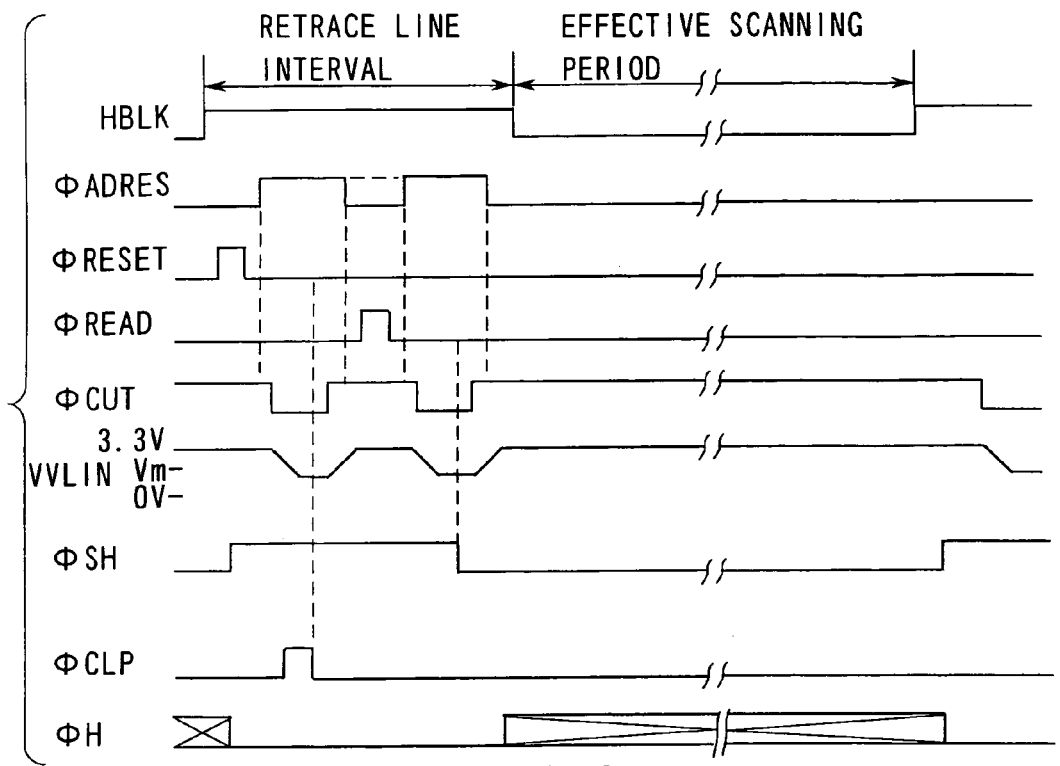
FIG. 6 is a timing waveform diagram to explain an example of the operation of the CMOS image sensor of FIG. 5.
Figure 7:
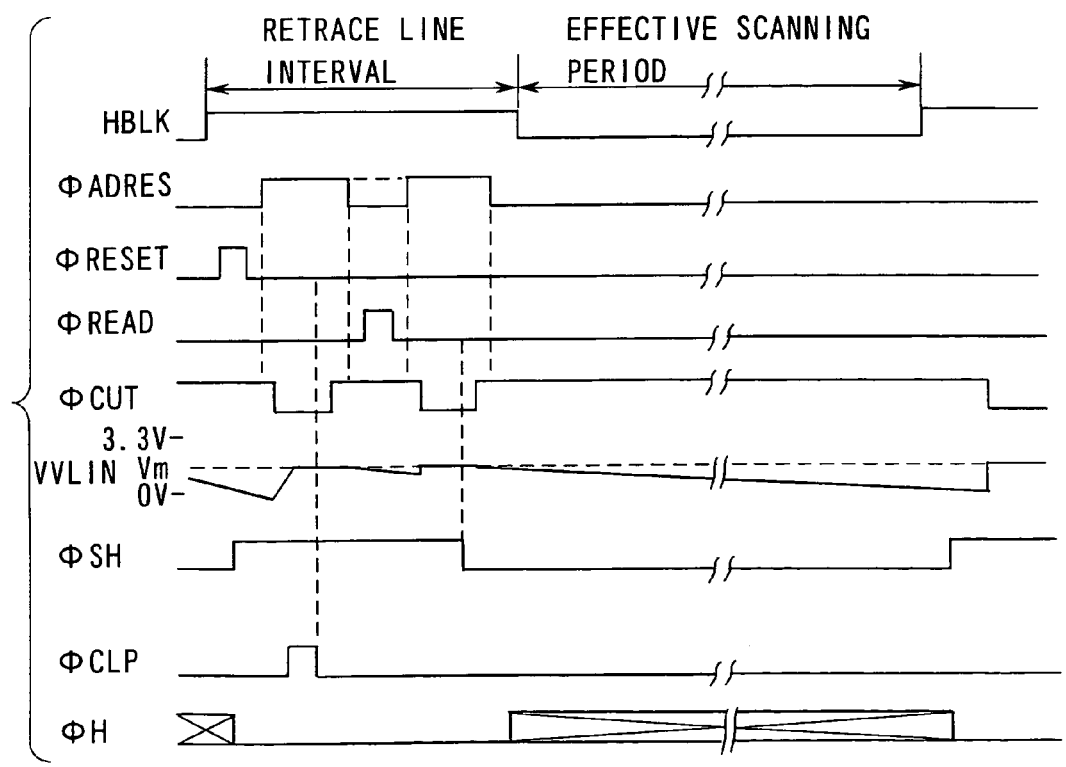
FIG. 7 is a timing waveform diagram to help explain the operation when the timing for the operation of the CMOS image sensor of FIG. 5 is changed.

FIG. 6 is a timing waveform diagram to help explain an example of the operation of the CMOS image sensor of FIG. 5.

The operation of the CMOS image sensor of FIG. 5 is basically the same as that of the CMOS image sensor of conventional equivalent 2 in FIG. 22, except that the control operation by the source follower control switch circuit 50 is added.

Specifically, the source follower control switch circuit 50 makes the φ CUT pulse low in a period during which the source follower amplifier circuit amplifies the signal photoelectrically converted by the CMOS image sensor and outputs the amplified signal to the sample hold transistor TSH at the next stage (or a period during which φ ADRES pulse is on), thereby turning off the load cutting transistor TCUT (or turning on the bias applying transistor TCUTN), which brings the load transistor TL into the active state to activate the source follower amplifier circuit. At this time, the voltage VVLIN on each vertical signal line VLIN becomes the operating voltage Vm (about 1V to 1.5V) of the source follower amplifier circuit.

In the period during which the φ ADRES pulse is off, the source follower control switch circuit 50 makes the φ CUT pulse high, thereby turning on the load cutting transistor TCUT and simultaneously turning off the bias applying transistor TCUTN, which turns off the load transistor TL to prevent the source follower amplifier circuit from operating.

As described above, since the source follower amplifier circuit is allowed to operate only in the necessary period and prevented from operating in the remaining period, the power consumption of the source follower amplifier circuit can be reduced (to about ½ to ¼ of the conventional equivalents).

In addition, the φ CUT pulse is so controlled that it rises earlier than the falling of the φ ADRES pulse and falls later than the rising of the φ ADRES pulse. This allows a specific bias voltage (in the example, power supply voltage VDD=3.3V) to be applied to the vertical signal line VLIN via the vertical select transistor Ta and amplifying transistor Tb kept on by the φ ADRES pulse in the period during which the φ ADRES pulse is on, even when the φ CUT pulse is turned on (or when the load transistor TL is cut off).

In this case, when the φ ADRES pulse falls, the load transistor TL has already been cut off. Therefore, it is possible to make earlier the timing of the voltage VVLIN on the vertical signal line VLIN rising from the operating voltage Vm of the source follower amplifier circuit to VDD.

Since a specific bias voltage is applied to the voltage VVLIN of the vertical signal line VLIN in the periods (including the effective scanning period) during which the source follower amplification circuit is prevented from operating, one end (drain) of the sample hold transistor TSH at the next stage is biased in the reverse direction with respect to the substrate region (in this example, p-well=0V), suppressing the leakage current, which suppresses image noise, such as vertical lines, and produces a signal free from vertical lines or no unevenness.

While in FIG. 6, the signal (φ ADRES pulse) on the vertical select line 6 in the same row is turned on twice intermittently in the horizontal retrace line interval, the present invention is not limited to this. Like the φ ADRES pulse of conventional equivalent 2 in FIG. 23, the φ ADRES pulse may be turned on once. This produces almost the same effect as described above.

In the operation of the CMOS image sensor of FIG. 5, if the φ ADRES pulse and φ CUT pulse were so controlled that their on and off states are inverted in synchronization with each other, the vertical signal line VLIN would go into the floating state when the φ ADRES pulse is off (or the φ CUT pulse is on). This would maintain the voltage VVLIN (=Vm) on the vertical signal line VLIN when the φ ADRES pulse is on.

However, when the leakage current develops during the effective horizontal scanning period which is relatively long, the voltage VVLIN on the vertical signal line VLIN can become 0V. An embodiment of the present invention which has solved the problem will be explained below.

FOURTH EMBODIMENT

Figure 8:
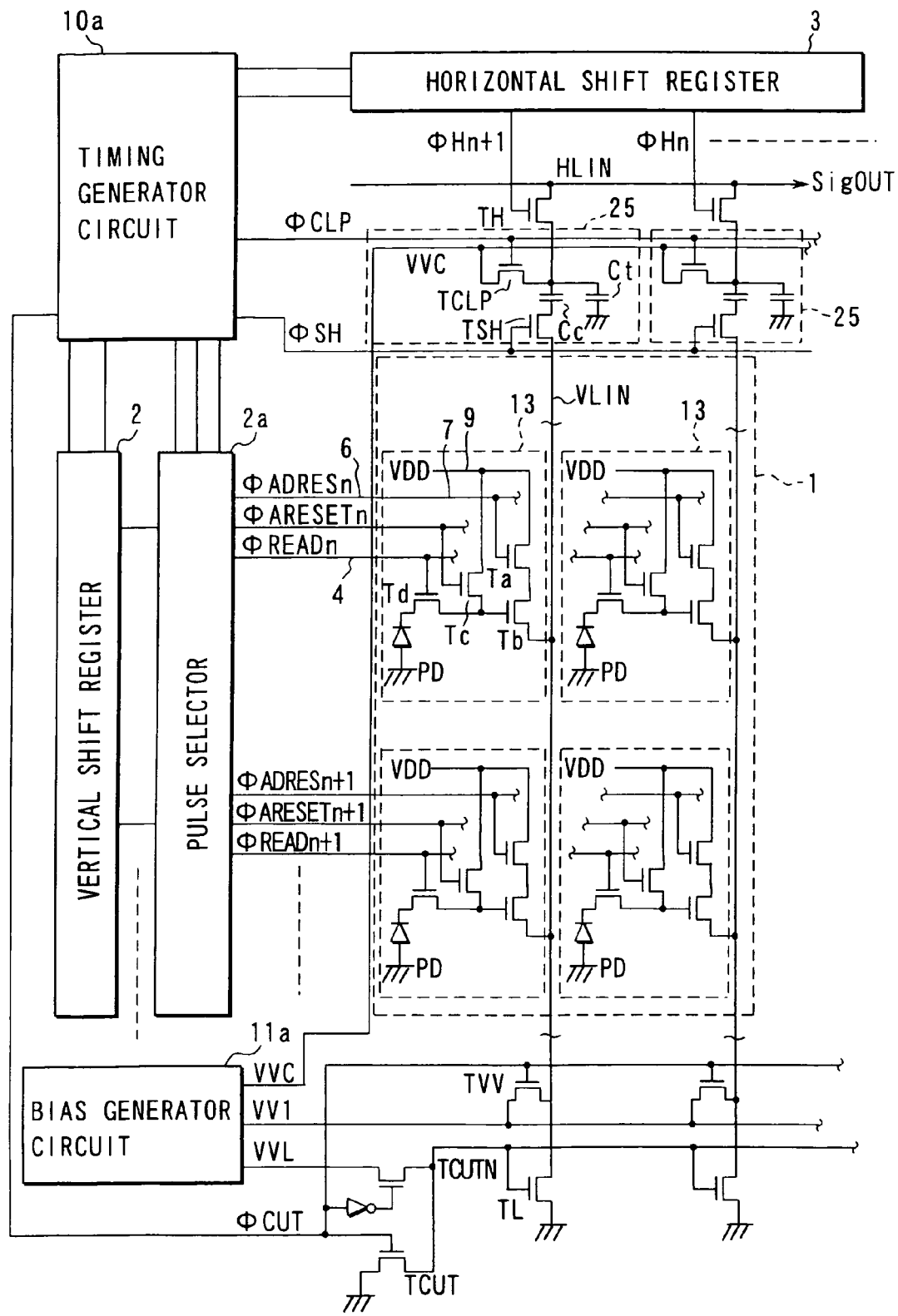
FIG. 8 shows an equivalent circuit of a CMOS image sensor according to a fourth embodiment of the present invention.

FIG. 8 shows an equivalent circuit of an amplification CMOS image sensor according to a fourth embodiment of the present invention.

The CMOS image sensor of FIG. 8 differs from the CMOS image sensor of the third embodiment of FIG. 5 in the following two points: (1) the φ ADRES pulse and φ CUT pulse are switched simultaneously in a reverse manner; and (2) in a period during which the source follower amplifier circuit is prevented from operating (including the effective horizontal scanning period), a bias applying transistor (switching transistor) TVV is connected between the vertical signal line VLIN and the bias voltage (VV1) output node of the bias generator circuit 11a and the φ CUT pulse is applied to the gate of the bias applying transistor in order to apply the same or almost the same voltage as the operating voltage Vm of the source follower amplifier circuit to the vertical signal line VLIN as a specific bias voltage VV1.

Figure 9:
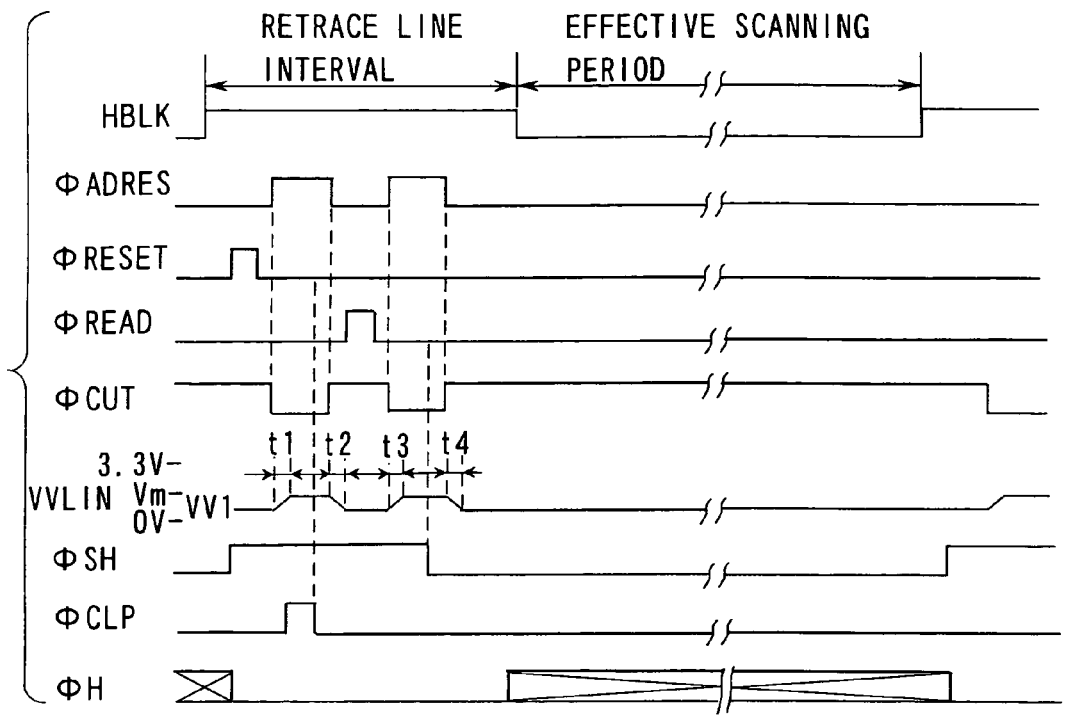
FIG. 9 is a timing waveform diagram to explain an example of the operation of the CMOS image sensor of FIG. 8.

FIG. 9 is a timing waveform diagram to help explain an example of the operation of the CMOS image sensor of FIG. 8.

The operation of the CMOS image sensor of FIG. 9 is basically the same as that of the CMOS image sensor according to the third embodiment (refer to FIG. 6), except that the bias applying transistor (switching transistor) TVV turns on when the φ ADRES pulse is off (or φ CUT pulse is on).

In the control of FIG. 9, even when the φ ADRES pulse and φ CUT pulse are operated simultaneously in a reverse manner, the load transistor TL can be turned off in a period during which the φ ADRES pulse is off (or φ CUT pulse is on) and at the same time, a specific bias voltage VV1 (=0.5 to 2V) equal to or almost equal to the operating voltage Vm (about 1.5V) of the source follower amplifier circuit can be applied to the vertical signal line VLIN.

Moreover, since the bias applying transistor (switching transistor) TVV is switched in synchronization with the φ CUT pulse, the on time of the φ ADRES pulse can be shortened, leading to a decrease in the power consumption of the source follower amplifier circuit.

In addition, the voltage difference between the operating voltage Vm of the source follower amplifier circuit and the bias voltage VV1 is made smaller, speeding up the response of the vertical signal line VLIN and shortening the rising times t1, t2 and falling times t2, t4 of the voltage VVLIN on the vertical signal line VLIN, which makes faster the operating speed of the source follower amplifier circuit.

Additionally, since the amount of change of potential on the vertical signal line VLIN is small, this decreases the operating current of the source follower amplifier circuit in switching the potential, which leads to a decrease in the spike noise.

Figure 10A:
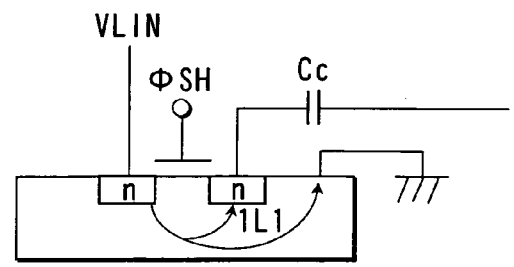
FIG. 10A is a sectional view of a transistor, for explaining the leakage current suppressing operation of the sample hold transistor in the noise chancellor circuit section of the CMOS image sensor of FIG. 8.
Figure 10B:
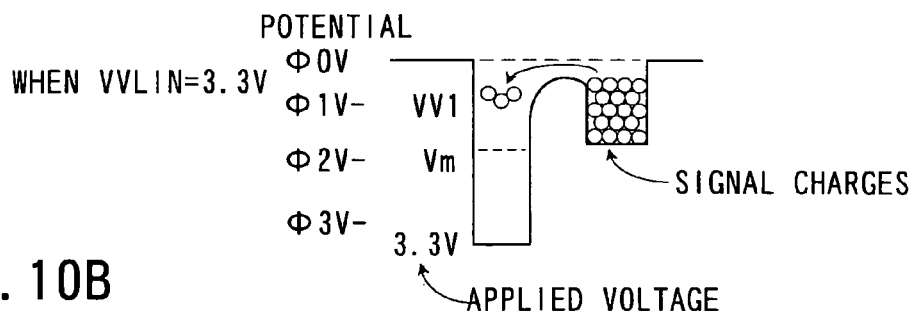
FIGS. 10B and 10C schematically show the potential in the transistor substrate.
Figure 10C:
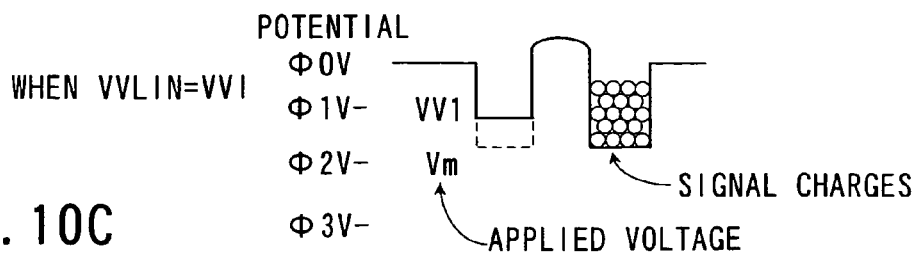

FIGS. 10A, 10B, and 10C are pictorial diagrams to help explain the leakage current suppressing operation in the sample hold transistor TSH of the noise chanceller circuit 25 in the CMOS image sensor of FIG. 8. FIG. 10A is a sectional view of the transistor TSH. FIGS. 10B and 10C show potentials in the substrate of the transistor TSH.

In FIG. 10A, when the voltage VVLIN on the vertical signal line VLIN is high, for example, at 3V, leakage current IL1 to the substrate develops. The leakage current IL1 can flow into the n-type source region of the coupling capacitor Cc of the sample hold transistor TSH, possibly resulting in image noise, such as vertical lines.

As shown in FIG. 10B, the potential at the channel region of the sample hold transistor TSH rises by capacitive coupling with the diffused layer, permitting the saturated-level signal charges to leak to the vertical signal line VLIN, which will possibly allow image noise, such as vertical lines, to appear.

In contrast, as shown in FIG. 10C, a specific bias voltage VV1 (=0.5 to 2V) is applied to the vertical signal line VLIN to set the potential at the channel region of the sample hold transistor TSH at about, for example, about −0.5V. This suppresses not only the leakage current IL1 to the substrate of FIG. 10A but also the leakage of saturated-level signal charges of FIG. 10B.

FIFTH EMBODIMENT

Figure 11:
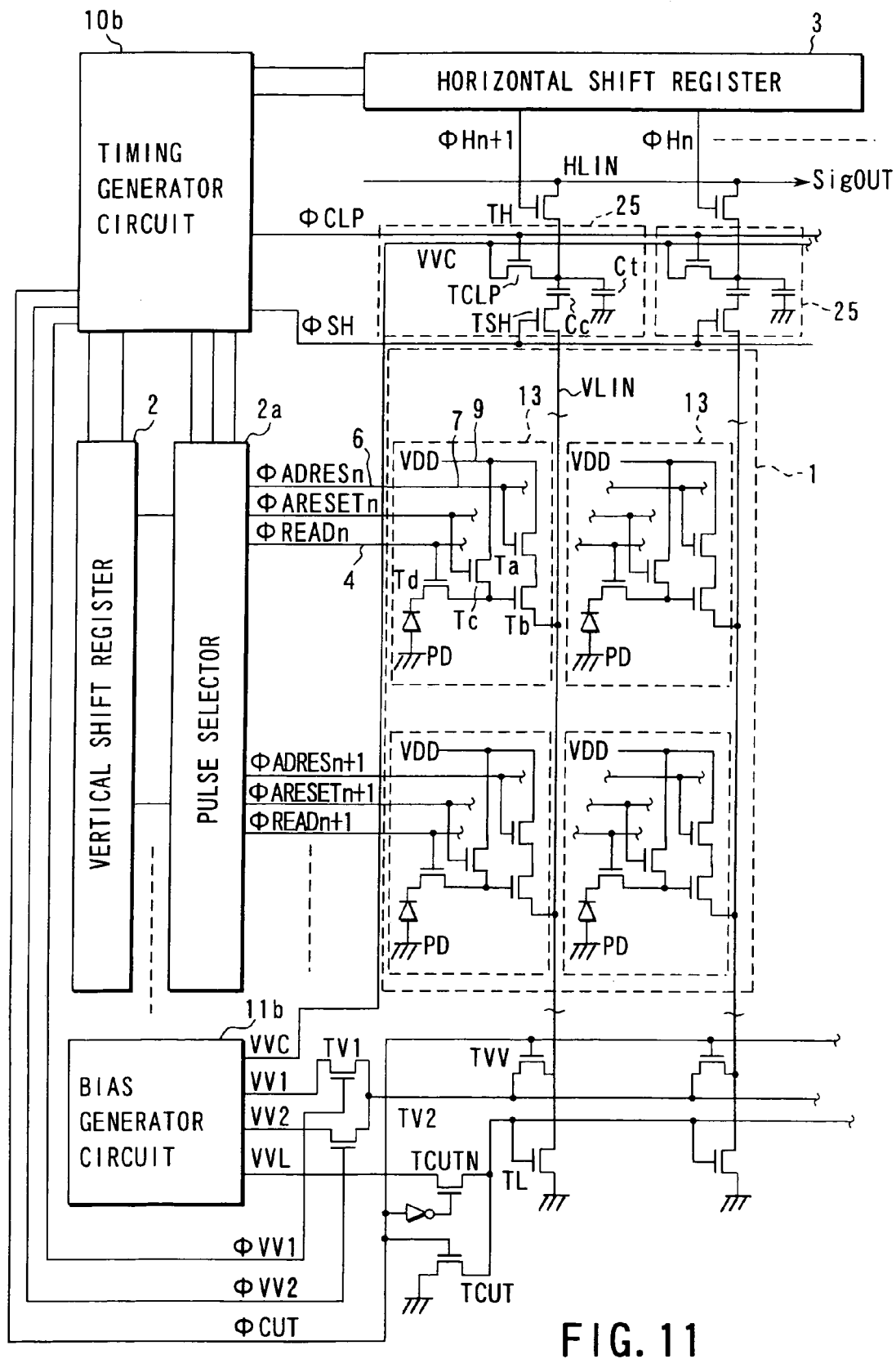
FIG. 11 shows an equivalent circuit of a CMOS image sensor according to a fifth embodiment of the present invention.

FIG. 11 shows an equivalent circuit of an amplification CMOS image sensor according to a fifth embodiment of the present invention.

The CMOS image sensor of FIG. 11 differs from the CMOS image sensor of the fourth embodiment of FIG. 8 in that there is an additional circuit configuration for switching between a first bias voltage VV1 and a second bias voltage VV2 and applying the selected one to the vertical signal line VLIN in a period (including the effective horizontal scanning period) during which the source follower is prevented from operating. In the circuit configuration, a first bias applying transistor (switching transistor) TV1 is connected between the vertical signal line VLIN and the first bias voltage (VV1) of the bias generator circuit 11b. A first control signal (φ VV1 pulse) from the timing generator circuit 10b is supplied to the gate of the transistor TV1. A second bias applying transistor (switching transistor) TV2 is connected between the vertical signal line VLIN and the second bias voltage (VV2) of the bias generator circuit 11b. A second control signal (φVV2 pulse) from the timing generator circuit 10b is supplied to the gate of the transistor TV2.

Figure 12:
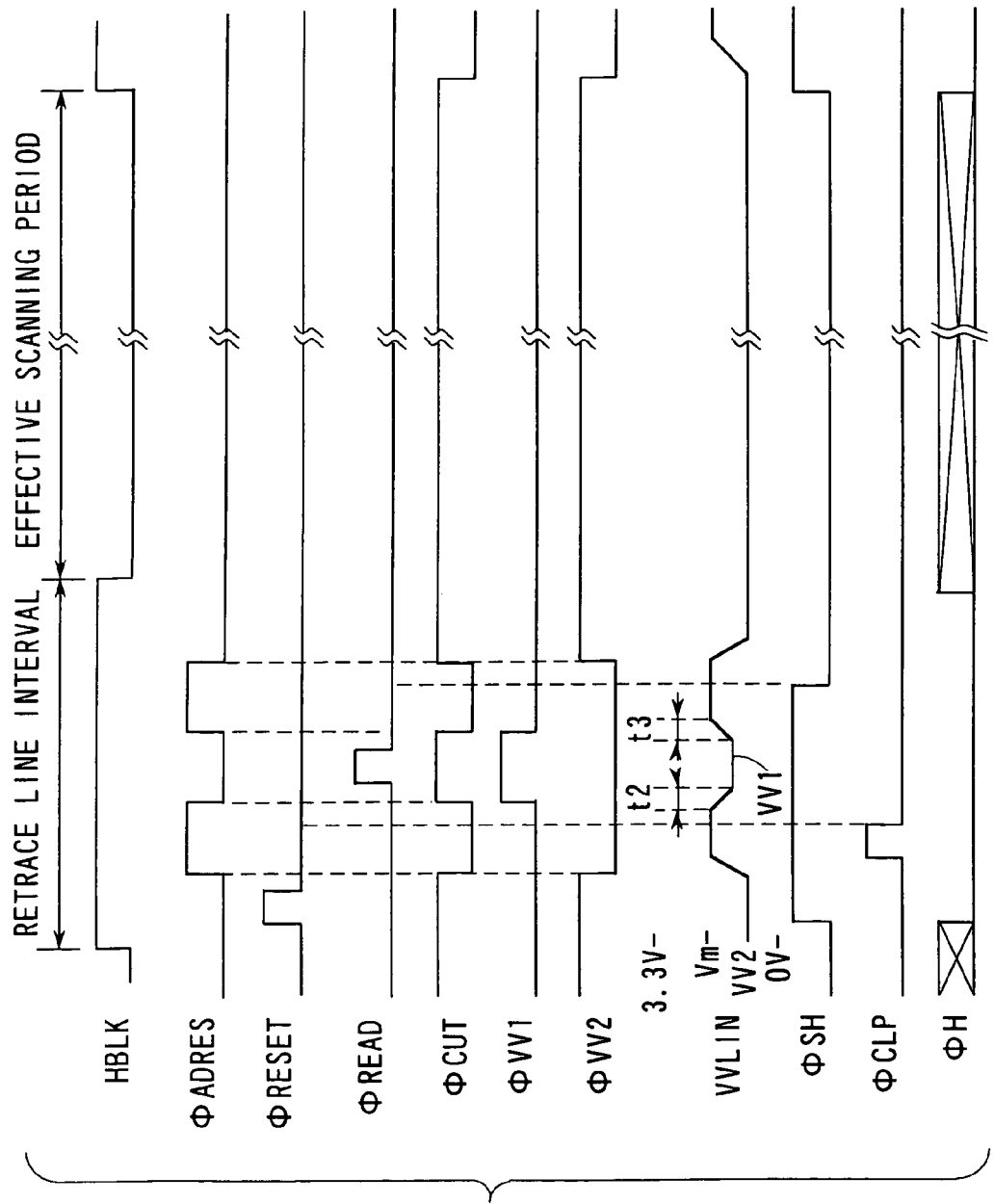
FIG. 12 is a timing waveform diagram to explain an example of the operation of the CMOS image sensor of FIG. 11.

FIG. 12 is a timing waveform diagram to help explain an example of the operation of the CMOS image sensor of FIG. 11.

The operation of the CMOS image sensor of FIG. 12 differs from the CMOS image sensor of the fourth embodiment (refer to FIG. 9) in the following points: each of φVV1 pulse and φVV2 pulse rises at the falling edge of φADRES pulse and falls at the rising edge of the φADRES pulse. Both of φVV1 pulse and φVV2 pulse are in the active state from the falling of the φADRES pulse till the rising of the next φADRES pulse. Here, φVV1 pulse is in the active state during the signal read period in the horizontal retrace line interval and φVV2 pulse is in the active state in the remaining period.

This makes it possible to set the voltage VVLIN on the vertical signal line VLIN to the first bias voltage VV1 after the first φADRES pulse has been turned off in the horizontal retrace line interval and then set the voltage VVLIN on the vertical signal line VLIN to the second bias voltage VV2 in the effective horizontal scanning period after the second φADRES pulse has been turned off. Since the time between the φ RESET pulse and φREAD pulse should be made as short as possible, the first bias voltage VV1 applied to the vertical signal line VLIN in the horizontal retrace line interval is set to a voltage at which leakage current is negligible, thereby improving the response.

For example, as in the CMOS image sensor of the fourth embodiment, the first bias voltage VV1 is set to a voltage in the range from 1.0V to 1.5V near the operating voltage Vm (about 1.5V) of the source follower circuit.

The off time of the φADRES pulse in the effective horizontal scanning period is about ten times as long as the off time of the φADRES pulse in the horizontal retrace line interval. It is therefore desirable that the leakage current in the effective horizontal scanning period should be about one-tenth of the leakage current in the horizontal retrace line interval. To do so, the second bias voltage VV2 applied to the vertical signal line VLIN in the effective horizontal scanning period is set lower than the first bias voltage VV1 applied to the vertical signal line VLIN in the horizontal retrace line interval, thereby reducing the leakage current as shown in FIG. 10.

Specifically, to reduce the leakage current in the effective horizontal scanning period, the second bias voltage VV2 is set to 0.5V to 1.4V lower than the first bias voltage VV1. In this case, if the second bias voltage VV2 were lower than 0.5V, leakage current could develop as a result of inefficient cutoff because the threshold voltage Vth of the sample hold transistor TSH is 0.5V.

In the first, second, fourth, and fifth embodiments, a bias is applied to prevent the potential on the vertical signal line from dropping to 0V in a period during which signal charges at the photodiode (8 or PD) are accumulated, excluding the time when the signal is outputted onto the vertical signal line (18-i or VLIN). This prevents the potential on the vertical signal line from being left in the floating state after the signal has been outputted onto the vertical signal line. Since the potential on the vertical signal line is prevented from dropping close to 0V due to leakage current, a spurious signal called smear is prevented from appearing on the display screen of the output signal.

With the potential on the vertical signal line left in the floating state after the signal has been outputted onto the vertical line, when strong light strikes only a specific pixel portion of the cell area 1, the photodiodes in that pixel portion are saturated, which permits signal charges to overflow into the nearby vertical signal lines, with the result that the potential on the vertical signal lines approaches 0V. On the other hand, since the photodiodes in the pixel portion not struck by light are set to a potential (e.g., 1V) higher than 0V, as the potential on the vertical signal line approaches 0V, electrons from the vertical signal line into which the signal charges have overflowed leak in the photodiodes in the pixel portion not struck by light.

When such a phenomenon takes place, a white line (a spurious line called smear) appears in the position corresponding to the pixel portion in the up and down direction of the pixel portion struck by the strong light on the display screen of the output signal of the photographing device.

In the second, fourth, and fifth embodiments, to apply a bias to the vertical signal line (18-$i$ or VLIN), the bias applying transistor (31 or TVV) has its one end connected to the vertical signal line, its other end connected to a bias voltage, and its gate connected to an on/off control signal. With this configuration, the timing of applying the bias is controlled. Instead of this, automatic bias applying means may be provided which applying the bias automatically according to the drop of the voltage on the vertical signal line.

In the second, fourth, and fifth embodiments, the special bias applying transistor (31 and TVV) has been connected to each vertical signal line (18-$i$ or VLIN). Instead of such a special bias applying transistor, a dummy pixel row having basically the same configuration as that of the read pixel row may be used to apply bias.

Those changes will be explained by reference to a sixth and a seventh embodiment of the present invention.

SIXTH EMBODIMENT

The configuration of a CMOS image sensor according to a sixth embodiment of the present invention differs the CMOS image sensor of the second embodiment of FIG. 3 in that a voltage of, for example, 1.2V is applied to the gate of each of the bias applying transistors 31 connected between the individual vertical signal lines 18-$i$ (i=1 to n) and specific power supply nodes. Since the bias applying transistors 31 have the function of absorbing surplus charges on the vertical signal lines 18-$i$ as described later, they are referred to as surplus charge absorbing transistors.

Figure 13:
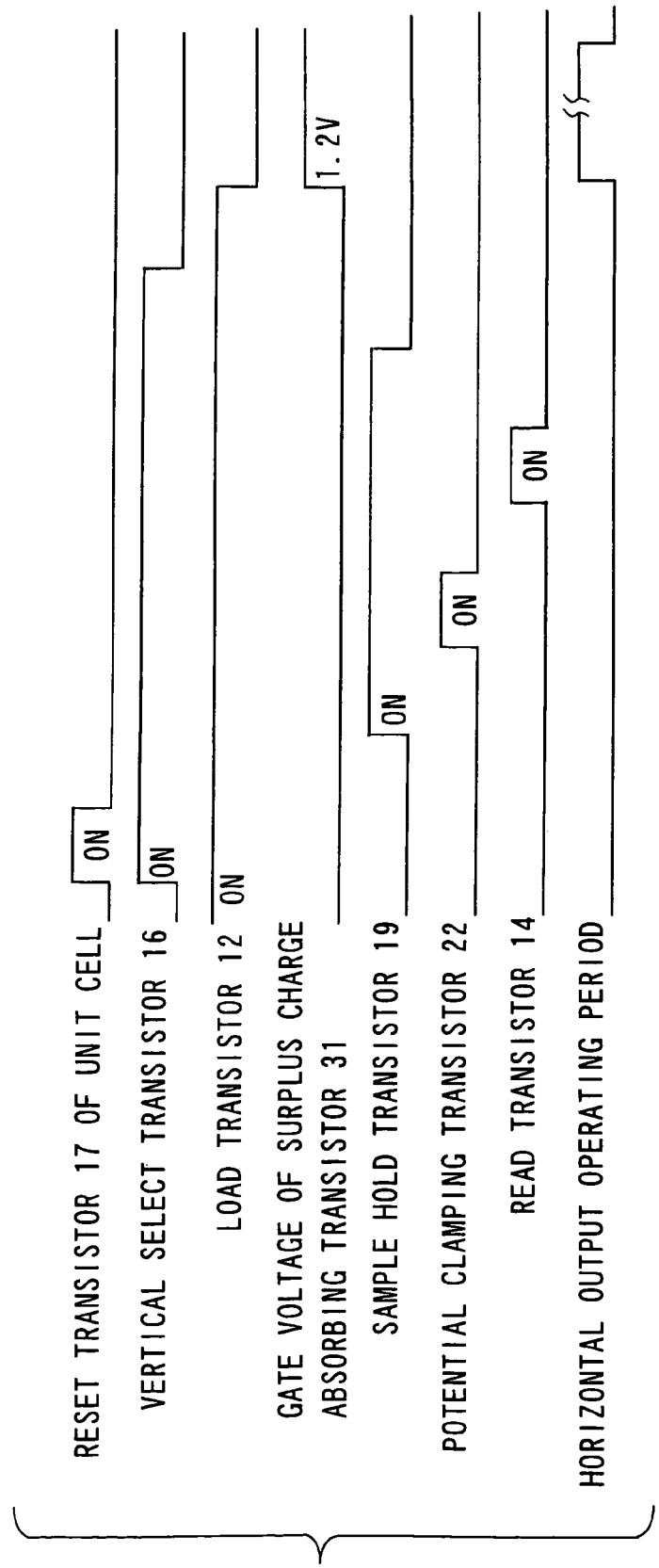
FIG. 13 is a timing waveform diagram to help explain the operation of a CMOS image sensor according to a sixth embodiment of the present invention.

FIG. 13 is a timing waveform diagram to help explain an example of the operation of the solid-state image sensor of the sixth embodiment.

It is assumed that the threshold voltage of the surplus charge absorbing transistors 31 in FIG. 3 is, for example, 0.7V. Since electrons are absorbed into the drains of the surplus charge absorbing transistors 31 when the potential on the vertical signal line 18-$i$ connected to the absorbing transistors drops below 0.5V in a period during which the photodiode 8 accumulates signal charges, the potential on the vertical signal line 18-$i$ is prevented from dropping to 0V, for example, below 0.5V.

As a result, a spurious signal, called smear, is less liable to develops. Specifically, even when electrons attempt to leak in the photodiodes 8 in the pixel portion not struck by the light from the vertical signal line 18-$i$, the substrate bias effect reduces the leakage of electrons into the photodiodes 8 in the pixel portion not struck by light, because the potential on the vertical signal line 18-$i$ is, for example, 0.5V, not 0V.

Specifically, the CMOS image sensor of the sixth embodiment is characterized by connecting to each vertical signal line 18-$i$ a switching element 31 that turns on automatically when the potential on the vertical signal line 18-$i$ drops below a specific potential in the period excluding the time when the signal is outputted onto the vertical signal line 18-$i$ and thereby automatically adjusting the timing of applying a bias to the vertical signal line 18-$i$ according to the voltage drop on the vertical signal line 18-$i$.

This prevents the potential on the vertical signal line 18-$i$ from dropping to 0V in the period excluding the time when the signal is outputted onto the vertical signal line 18-$i$. Even if leaks take place, the leakage of current from the vertical signal line 18-$i$ to the photodiodes 8 are suppressed.

Furthermore, the leakage of current through the sample hold transistor 19 of FIG. 3 decreases. If the horizontal select transistor 23-$i$ is connected directly to the vertical signal line 18-$i$, the leakage of current via the horizontal select transistor 23-$i$ to the horizontal signal line 26 decreases.

SEVENTH EMBODIMENT

Figure 14:
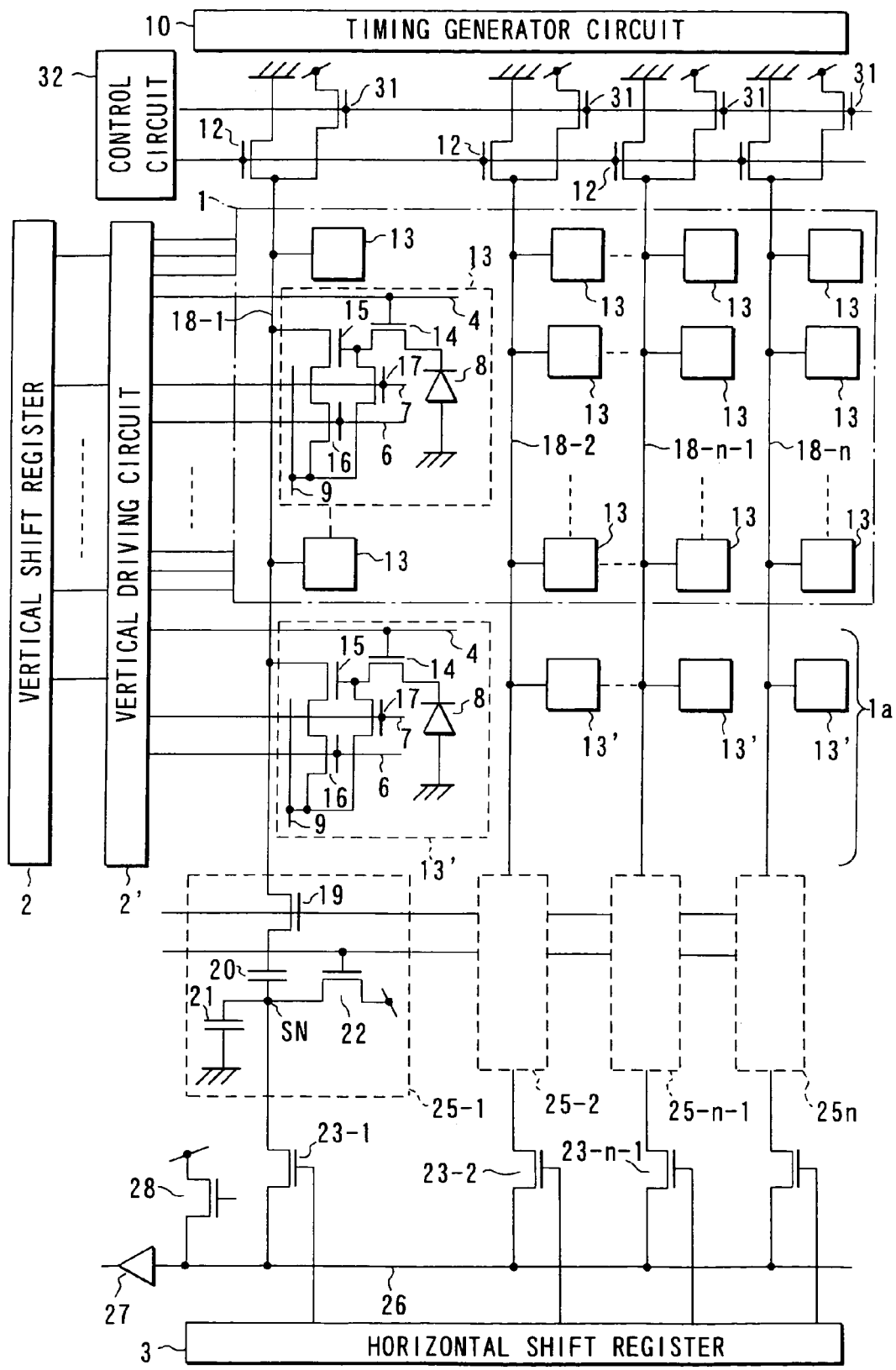
FIG. 14 shows an equivalent circuit of a CMOS image sensor according to a seventh embodiment of the present invention.
Figure 15:
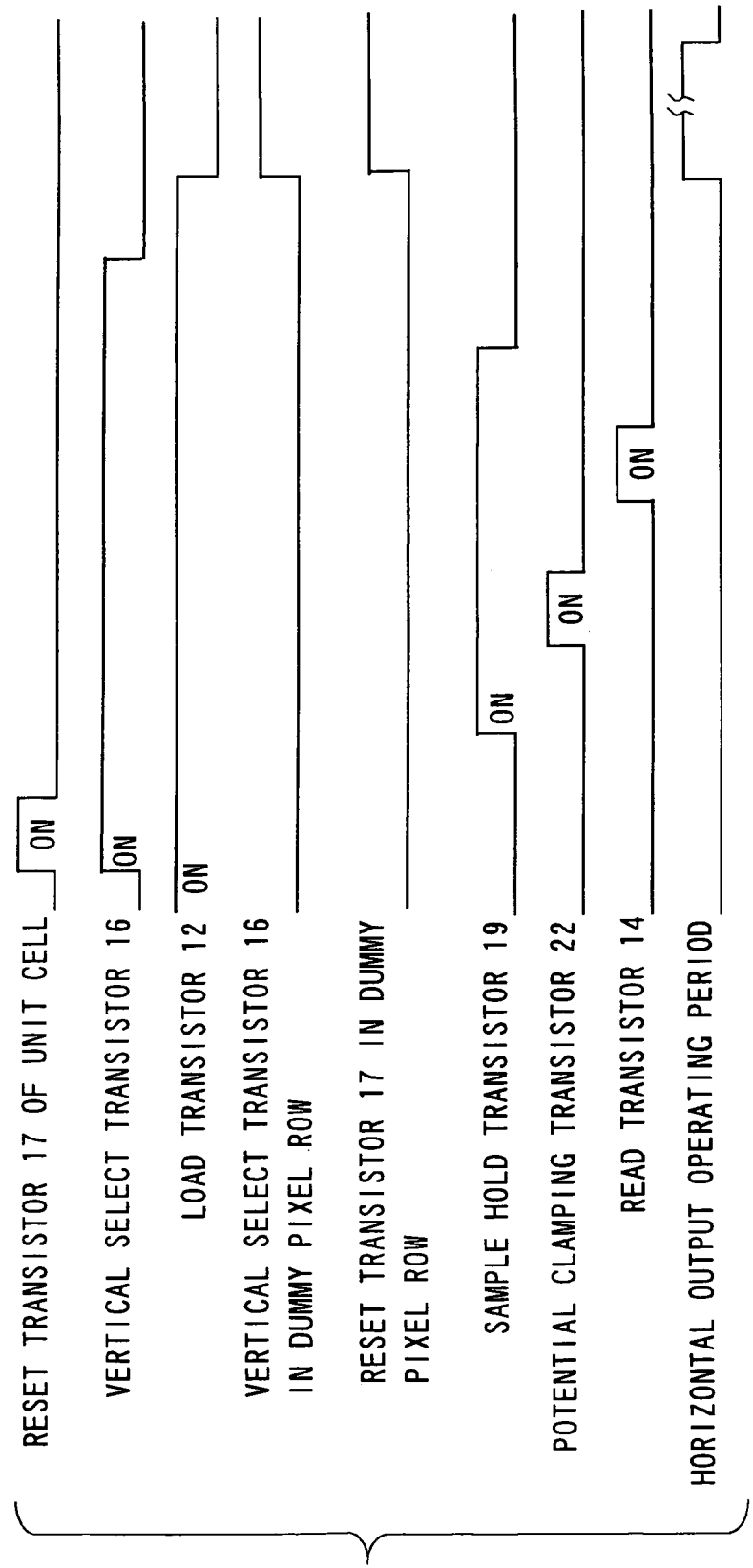
FIG. 15 is a timing waveform diagram to explain an example of the operation of the CMOS image sensor of FIG. 14.

FIG. 14 shows part of an equivalent circuit of a CMOS image sensor according to a seventh embodiment of the present invention. FIG. 15 is a timing waveform diagram to help explain an example of the operation of the CMOS image sensor according to the seventh embodiment.

The CMOS image sensor of FIG. 15 differs from the CMOS image sensor of the second embodiment of FIG. 3 in that a dummy pixel row 1$a$ is added. The dummy pixel row 1$a$ is formed by arranging dummy cells 13' in the direction of row differently from the read pixel row in the cell area 1. The dummy cell has the same structure as that of the unit cell 13 in the read pixel row. The number of shift stages of the vertical shift register 2 is increased according to the dummy pixel row 1$a$. The vertical select line (address line) 6 and reset line 7 corresponding to the dummy cells 13' in the dummy pixel row 1$a$ are activated with specific timing. Since the rest is the same as the second embodiment, the same parts as those in FIG. 3 are indicated by the same reference symbols. In FIG. 15, the vertical driving circuit 2' on the output-side of the vertical shift register 2 (not shown in FIG. 3) is shown.

In the CMOS image sensor of the seventh embodiment, the vertical select transistor 16 and reset transistor 17 of each dummy cell 13' in the dummy pixel row 1$a$ are operated as surplus charge absorbing transistors in the signal charge accumulation period. When the potential on the vertical signal line 18-$i$ drops below ascertain potential, the vertical select transistors 16 and amplifying transistors 15 in the dummy pixel row 1$a$ turn on, allowing surplus charges on the vertical signal lines 18-$i$ to be absorbed into the drains of the vertical select transistors 16, which prevents the potential on the vertical signal lines 18-$i$ from dropping to 0V.

As a result, a spurious signal called smear is less liable to develop. Specifically, since the potential on the vertical signal line 18-$i$ is, for example, 0.5V, not 0V, the substrate bias effect suppresses the leakage of electrons from the vertical signal line 18-*i* into the pixel portion not struck by light.

Since the bias applying transistor 31 of FIG. 14 has nothing to do with the above operation, it may be eliminated.

Specifically, the CMOS image sensor of the seventh embodiment is characterized by turning on the vertical select transistor 16 and amplifying transistor 15 in the dummy pixel row 1*a* when the potential on the vertical signal line 18-*i* drops below a certain potential in the period excluding the time when the signal is outputted onto the vertical signal line 18-*i* and thereby automatically adjusting the timing of applying a bias to the vertical signal line 18-*i* in accordance with the voltage drop of the vertical signal line 18-*i*.

This not only prevents the potential on the vertical signal line 18-*i* from dropping to 0V in the period excluding the time when the signal is outputted onto the vertical signal line 18-*i*, but also suppresses the leakage of electrons from the vertical signal line 18-*i* to the photodiodes 8.

When the leakage of electrons through the sample hold transistor 19 of FIG. 14 decreases and the horizontal select transistor 23-*i* is connected directly to the vertical signal line 18-*i*, this reduces the leakage of electrons to the horizontal signal line 26 via the horizontal select transistor 23-*i*.

In the seventh embodiment, after the vertical shift register 2 has selected a frame (field) and completed the shift operation from the first stage to the last stage (or after it has read the signals from the unit cells 13 in the read pixel rows), it returns to the first stage again and starts to select the next frame. In this case, in the period (vertical retrace line interval) until it returns to the first stage, it is still supplying the output at the last stage. In the period, the vertical driving circuit 2' drives the vertical select transistor 16 and reset transistor 17 in the dummy pixel row 1*a*. This prevents the load of the vertical driving circuit 2' from varying in the vertical scanning period and vertical retrace line interval, avoiding variations in the voltage on the power-supply line 9, which prevents horizontal lines from appearing when the output signal from the solid-state imaging device is displayed on the screen of the image display unit.

As explained in the sixth embodiment and seventh embodiment, the operation of preventing the potential on the vertical signal line 18-*i* from dropping to 0V is applied not only to the signal charge accumulation period but also to the entire period excluding the signal charge reading period even in the horizontal retrace line interval. This produces a greater effect and suppresses the generation of spurious signals more.

The seventh embodiment has employed the configuration which enables a bias to be applied automatically to the vertical signal line 18-*i* according to the voltage drop of the vertical signal line 18-*i*. The vertical select transistor 16 and reset transistor 17 in the dummy pixel row 1*a* may be turned on in the signal charge accumulation period and the vertical signal line 18-*i* may be set directly to a specific bias potential, for example, to the same as or almost the same as the operating voltage of the source follower amplification circuit as in the second, fourth, or fifth embodiment.

While in each of the above embodiments, the CMOS image sensor has been composed of an array of single-pixel unit cells 13, each made up of one photodiode PD and four transistors, the present invention is not limited to this. It may be applied to an image sensor where a load transistor is connected to one end of the vertical signal line (e.g., a CMOS image sensor composed of an array of two-pixel unit cells, each made up of two photodiodes PD and five transistors) or to a stacked image sensor with stacked photoelectric conversion sections.

While an n-type MOS transistor has been used as the switching element, a CMOS switch composed of a pair of an n-type MOS transistor and a p-type MOS transistor may be used. Although the voltage relationship is opposite to that of each of the above embodiments, a p-type source follower amplification circuit may be used.

With the solid-state imaging device of the present invention, current leakage after a series of noise removing operations by the noise chancellor circuit in a read operation for each horizontal line can be suppressed, preventing image noise, such as vertical lines, from appearing on the display screen of the output signal from the image sensor, which produces a clear image with a high S/N ratio.

Furthermore, with the solid-state imaging device of the invention, it is possible not only reduce the power consumption of the CMOS image sensor but also suppress image noise, such as vertical lines.

Another embodiment of the present invention will be explained in detail by reference to the accompanying drawings.

EIGHTH EMBODIMENT

The configuration of a CMOS image sensor according to an eighth embodiment of the present invention is almost the same as that of the CMOS image sensor of conventional equivalent 1, except for a method of connecting the horizontal select transistor to the horizontal signal line in the horizontal readout gate section, a pattern structure where two adjacent horizontal select transistors forms a set, and therefore the connection between a set of two horizontal select transistors and the vertical signal line.

Figure 16:
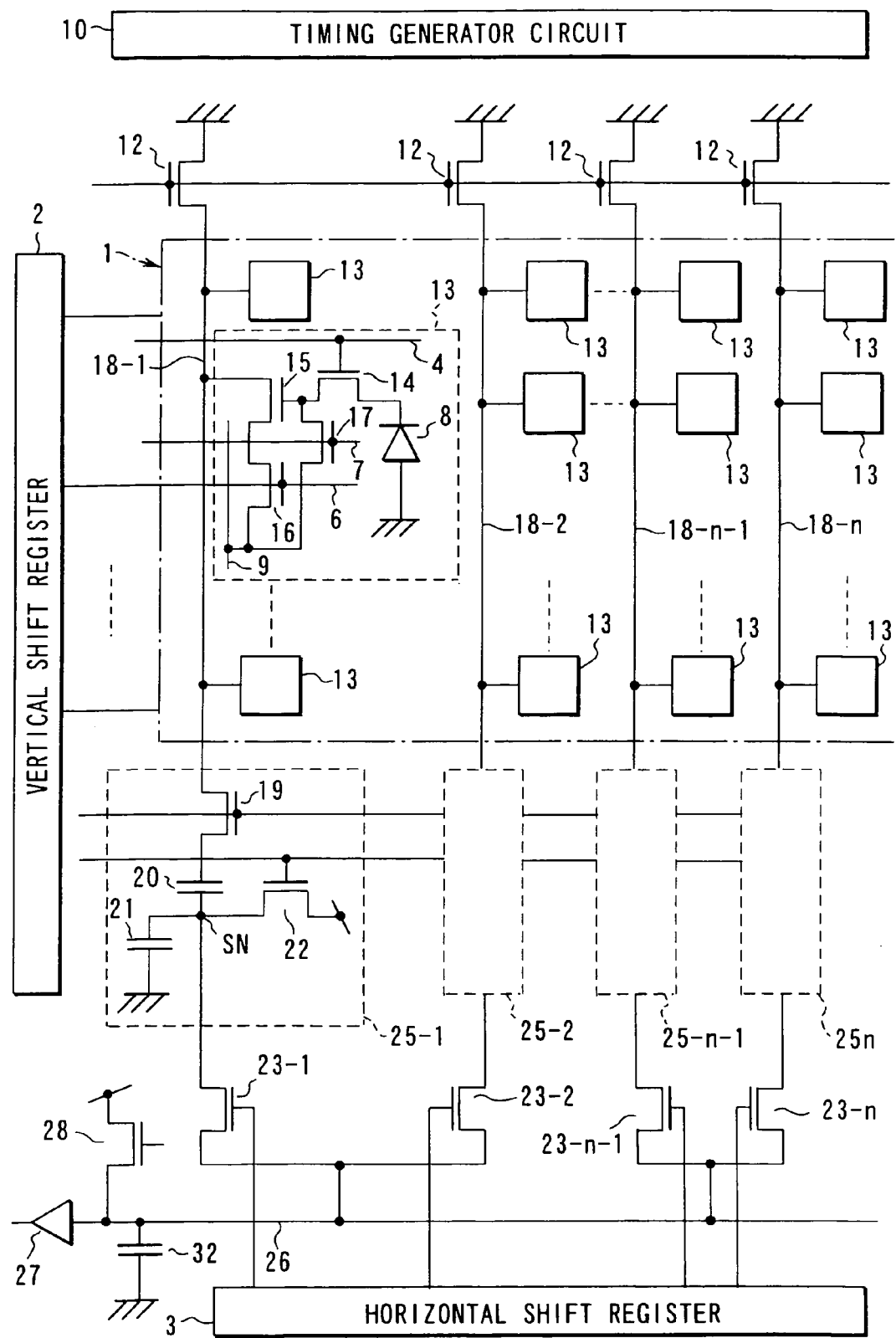
FIG. 16 shows an equivalent circuit of a cmos image sensor according to the eighth embodiment of the present invention.

FIG. 16 shows an equivalent circuit of the CMOS image sensor of the eighth embodiment.

The CMOS image sensor of FIG. 16 differs from the CMOS image sensor of conventional equivalent 1 in FIG. 20 in that two adjacent ones of the horizontal select transistors 23-*i* form a set and one end of each of the two horizontal select transistors in each set is connected to one another and further connected in common to the horizontal signal line 26. Since the rest is the same as in the conventional equivalent, the same parts as those in FIG. 20 are indicated by the same reference symbols.

Figure 17:
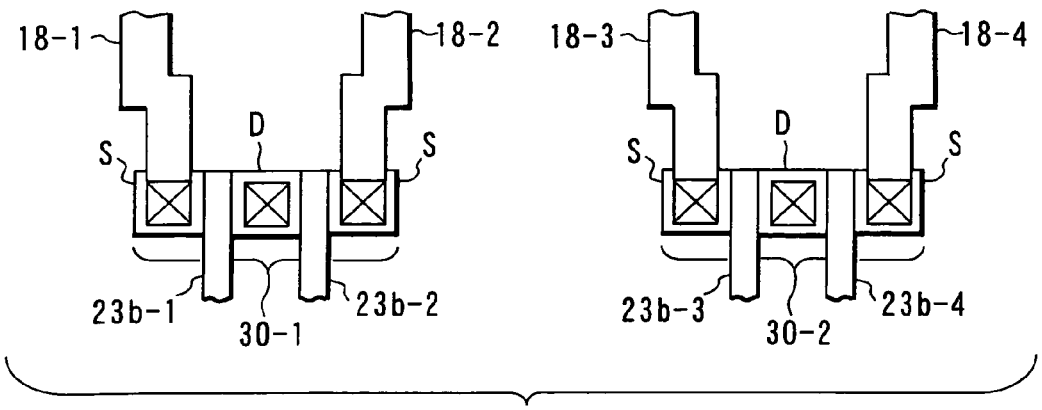
FIG. 17 shows an example of the pattern SDG and connection pattern with horizontal signal lines in part of the horizontal select transistor of FIG. 16.

FIG. 17 shows an SDG pattern of part of the horizontal select transistor 23-*i* (i=1 to n) of FIG. 16 and its connection pattern with the vertical signal line 18-*i*.

Each horizontal select transistor 23-*i* of FIG. 16 is composed of an NMOS transistor having an active region (SDG region) formed in a p-well selectively formed at the surface of a semiconductor substrate. The p-well is connected to the ground potential.

In FIG. 17, the SDG regions 30-*j* (j=1 to n/2) of the individual sets, each of which is formed from two adjacent ones of the horizontal select transistors 23-*i*, are arranged in the horizontal direction. An element isolation region 31 is present between the SDG regions 30-*j* in the individual sets.

Reference symbol 23*b-i* indicates the gate electrode (polysilicon wire) of the horizontal select transistor 23-*i* and is formed above each channel of the SDG region 30-*j* via an gate insulation film (not shown) formed on the p-well surface.

A metal wire (normally, aluminum wire) corresponding to the horizontal signal line 26 is connected to the n-type diffused region in the middle of the SDG region 30-*j*. In the embodiment, the n-type diffused region in the middle functions as a common drain region D in the SDG region 30-*j* in each set and is connected to the horizontal signal line 26. The n-type diffused regions at both ends sandwiching the common drain region D act as source regions S.

In this case, the common drain region D in the SDG region 30-*j* in each set is formed narrower than two of the source regions S. That is, it is formed narrower than two drain regions in the SDG region in the conventional equivalent. In the eighth embodiment, each common drain region D is formed equal to one drain region in the conventional equivalent.

Therefore, in the case of two MOS transistors sharing a drain region D, the coupling capacitance between the drain region and the p-well decreases (reduces by half in the eighth embodiment) as compared with two horizontal select transistors 23-*i* in the conventional equivalent. As a result, the parasitic capacitance dependent on the number of horizontal select transistors 23-*i* becomes smaller (reduces by half in the eighth embodiment) than the parasitic capacitance 29 in the conventional equivalent.

In the eighth embodiment, the SDG region 30-*j* shared by two MOS transistors, not each transistor, is connected to the horizontal signal line 26. This reduces the number of contacts between the horizontal select transistors 23-*i* and horizontal signal lines 26 as compared with the conventional equivalent. As a result, the contact capacitance is smaller than that in the conventional equivalent.

Furthermore, the size of the SDG region 30-*j* in each set is shorter in the horizontal direction than two SDG regions in the conventional equivalent. The pattern of vertical signal lines 18-*i* connected in a one-to-one correspondence to the source regions S of the SDG regions 30-*j* in the individual sets is changed from the conventional equivalent. Specifically, in FIG. 17, metal wires (normally, aluminum wires) corresponding to the vertical signal line 18-*i* are connected in a one-to-one correspondence to the source regions S at both ends of the SDG regions in the individual sets.

In the eighth embodiment, two adjacent ones of the vertical signal lines 18-*i* form a set. The pattern is so formed that the distance between the tips of the horizontal readout gates of the two vertical signal lines 18-*i* in each set substantially coincides with the distance between the two source regions S of the SDG region 30-*j* in each set. The pattern is such that it is composed of sets of two adjacent vertical signal lines 18-*i* and the horizontal readout gate tips are bent stepwise in the direction in which the tips approach each other.

The operation of the CMOS image sensor constructed as shown in FIGS. 16 and 17 is basically the same as that of the conventional equivalent, except that the operating speed of the circuit is faster, because the parasitic capacitance 32 of the horizontal line 26 dependent on the number of horizontal select transistors 23-*i* decreases (reduces by half in the embodiment).

The layout of the source region S and common drain region D of one transistor in the SDG region 30-*j* in each of the sets is symmetrical with the layout of the source region S and common drain region D of the other transistor. In other words, the pattern of the source region S of one transistor is symmetrical with the pattern of the source region S of the other transistor, as a result, the coupling capacitances of the two symmetrical source regions may differ from each other due to variation in manufacturing process and so on.

With the difference in the coupling capacitance between the source regions, after the horizontal shift register 3 has selected one of the horizontal select transistors 23-*i*, when the transistors are driven in sequence, the coupling capacitance differs from one select transistor 23-*i* to another, which can permit image noise to occur.

In order to solve the above problem, the eighth embodiment of the present invention is different from conventional equivalent 1 in the following points.

Figure 18:
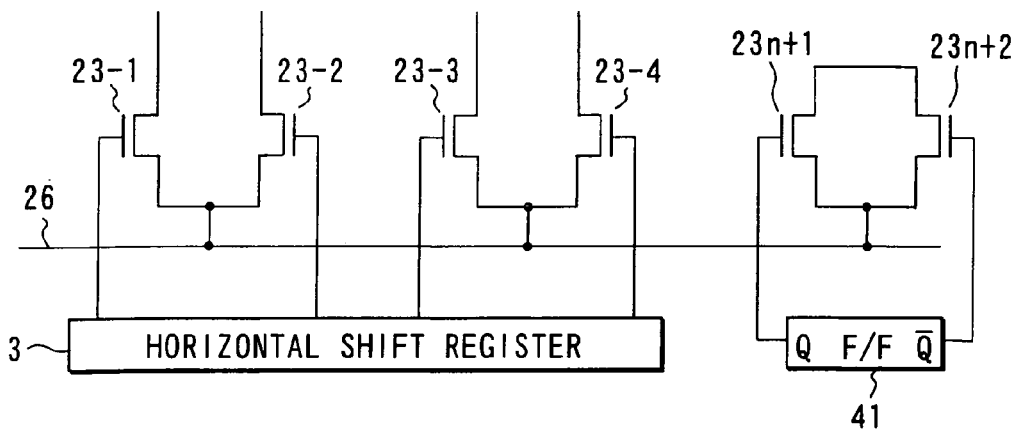
FIG. 18 shows an equivalent circuit of horizontal select transistors and correction transistors of a CMOS image sensor shown in FIG. 16.

FIG. 18 shows an equivalent circuit of horizontal select transistors and correction transistors of a CMOS image sensor shown in FIG. 16.

Figure 19:
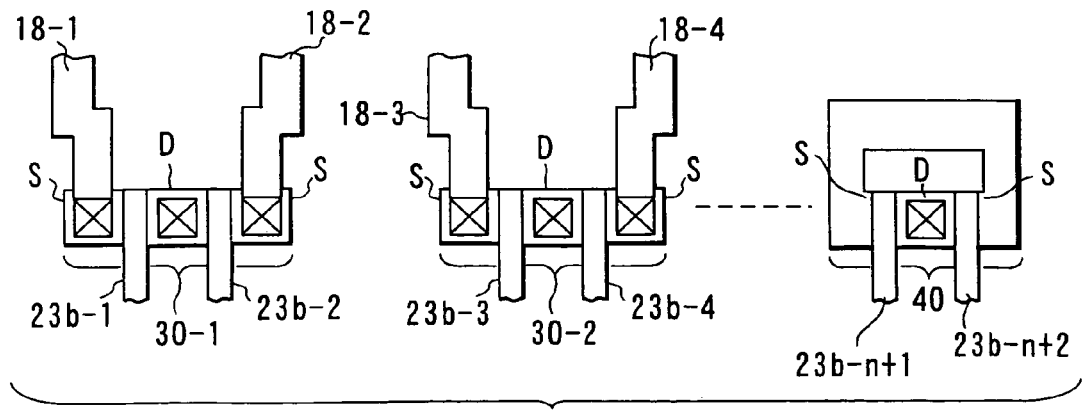
FIG. 19 shows an example of the SDG pattern of horizontal select transistors and correction transistors of FIG. 18 as well as a connection pattern regarding horizontal signal lines and those transistors.

FIG. 19 shows an example of an SDG pattern and a connection pattern of the vertical signal line 18-*i* with respect to horizontal select transistors and correction transistors shown in FIG. 18.

In other words, the CMOS image sensor according to the present invention as shown in FIGS. 18 and 19 further comprises two correction transistors (a first correction transistor 23*n*+1 and a second correction transistor 23*n*+2) are added. The two correction transistors are used to correct variations in the coupling capacitance at the source region for each select transistor when the horizontal select transistors 23-*i* are selected and driven sequentially.

In the SDG region 40 of the two correction transistors 23*n*+1, 23*n*+2, the drain region D is shared by the two transistors as in the SDG region 30-*j* in each set of the horizontal select transistors 23-*i*, and the source regions S sandwiching the common drain region D are connected to each other and is in the floating state. The SDG region 40 is so formed that, for example, it is in line with the SDG region 30-*j* in each of the individual sets.

When any one of the horizontal select transistors 23-*i* is selected and driven by the horizontal shift transistor 3, one of the two correction transistors 23*n*+1, 23*n*+2, whose source region and common drain region are symmetrical with the selected horizontal select transistor, is selected and driven by a correction transistor circuit 41.

The correction transistor driving circuit 41 is designed to supply a gate control signal which selects the second correction transistor 23*n*+2 when odd-numbered transistors in the horizontal direction of the horizontal select transistors 23-I are selected, and the first correction transistor 23*n*+1 when even-numbered transistors are selected. For example, a flip-flop circuit may be used. In the case that a flip-flop circuit is used, a pair of complementary output nodes Q, /Q of the flop-flop circuit shall be connected respectively to gates 23*b*-*n*+1, 23*b*-*n*+2 of a pair of the two correction transistors 23*n*+1, 23*n*+2 and the flop-flop circuit 41 may reverse its state according to the shift operation of the horizontal shift register 3.

The correction transistor driving circuit 41 is preferably constructed in a manner such that it supplies a high gate control signal to each of the gates 23*b*-*n*+1, 23*b*-*n*+2 of the two correction transistors 23*n*+1, 23*n*+2 to turn them on, that it selects the first correction transistor 23*n*+1 and supplies a low gate control signal to its gate 23*b*-*n*+1 when one of the odd-numbered transistors in the horizontal direction of the horizontal select transistors 23-*i* is selected, and that it selects the second correction transistor 23*n*+2 and supplies a low gate control signal to its gate 23*b*-*n*+2, when one of the even-numbered transistors is selected.

With this configuration, when any one of the horizontal select transistors 23-*i* is selected and turned on by the horizontal shift resistor 3, one of the two correction transistors 23*n*+1, 23*n*+2, which has the same layout of the source region and common drain region as that of the selected horizontal select transistor 23-*i*, is turned off. As a result, switching noise occurring as a result of the turning on of the selected horizontal select transistor 23-*i* can be canceled by switching noise occurring as a result of the turning off of the other of the correction transistors $23n+1$, $23n+2$.

While in the embodiments, the solid-image sensor with an array of single-pixel unit cells, whose equivalent circuit is as shown in FIG. 20, has been used, the present invention may be applied to a solid-state image sensor with an array of two-pixel unit cells.

While in the embodiments, the CMOS image sensor has been used, the present invention may be applied to a CCD image sensor with a horizontal readout gate section as explained in the embodiments.

Furthermore, the present invention may be applied to such a pixel structure as has two or more pixel reset transistors, address transistors, and amplifying transistors shared in operations, with each pixel provided with a separate read transistor and a separate photodiode.

As described above, with the solid-state imaging devices according to the embodiments of the present invention, it is possible to reduce the parasitic capacitance at the horizontal signal line dependent on the number of horizontal select transistors, speed up the circuit operation, decrease the amount of incoming noise due to the parasitic capacitance, suppress image noise, such as vertical lines, appearing on the display screen of the output signal from the solid-state image sensor owing to incoming noise, and produce clear images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A solid-state imaging device comprising:
an imaging area including,
unit cells arranged in a two-dimensional matrix on a semiconductor substrate, said unit cells each having a photoelectric conversion element;
vertical signal lines each being connected in common to the unit cells in the same column;
vertical select lines each being connected in common to the unit cells in the same row, configured to select the unit cells in the same row;
a driving circuit configured to selectively drive said vertical select lines;
load transistors each being connected to corresponding one of said vertical signal lines at one end;
signal storage regions each being connected to corresponding one of said vertical signal lines at the other end, configured to store a signal readout on the corresponding one of said vertical signal lines;
a horizontal signal line onto which signals stored in said signal storage regions are sequentially transferred;
transistors each being provided on a signal path arranged between corresponding one of said vertical signal lines and said horizontal signal line; and
a bias voltage control circuit configured to bias one of the drain and source of each of said transistors in the reverse direction with respect to the substrate region at least in a period during which the signals are transferred sequentially from said signal storage regions to said horizontal signal line,
wherein said bias voltage control circuit keeps activated a driving signal for selectively driving configured to selectively drive said vertical select lines for a read operation of corresponding row, at least in a period during which signals stored in said signal store regions are sequentially read out on said horizontal signal line.

2. A solid-state imaging device comprising:
an imaging area including,
unit cells arranged in a two-dimensional matrix on a semiconductor substrate, said unit cells each having a photoelectric conversion element;
vertical signal lines each being connected in common to the unit cells in the same column;
vertical select lines each being connected in common to the unit cells in the same row, configured to select the unit cells in the same row;
a driving circuit configured to selectively drive said vertical select lines;
load transistors each being connected to corresponding one of said vertical signal lines at one end;
signal storage regions each being connected to corresponding one of said vertical signal lines at the other end, configured to store a signal readout on the corresponding one of said vertical signal lines, and each including a control transistor having a current path being connected at one end to the other end of corresponding one of said vertical signal lines, a coupling capacitor having one end connected to the other end of said control transistor, a charge accumulating capacitor connected to the other end of said coupling capacitor, and a potential clamping transistor being connected to a junction node between said two capacitors;
a horizontal signal line onto which signals stored in said signal storage regions are sequentially transferred;
transistors each being provided on a signal path arranged between corresponding one of said vertical signal lines and said horizontal signal line; and
a bias voltage control circuit configured to bias one of the drain and source of each of said transistors in the reverse direction with respect to the substrate region at least in a period during which the signals are transferred sequentially from said signal storage regions to said horizontal signal line,
wherein said bias voltage control circuit not only keeps said load transistors off but also controls the potentials of said vertical signal lines in a manner such that one of the drain and source of each of said control transistors is in the reverse bias state with respect to the substrate region, at least in a period during which signals stored in said signal store regions are sequentially read out on said horizontal signal line.

3. A solid-state imaging device comprising:
an imaging area including,
unit cells arranged in a two-dimensional matrix on a semiconductor substrate, said unit cells each having a photoelectric conversion element;
vertical signal lines each being connected in common to the unit cells in the same column;
vertical select lines each being connected in common to the unit cells in the same row, configured to select the unit cells in the same row;
a driving circuit configured to selectively drive said vertical select lines;
load transistors each being connected to corresponding one of said vertical signal lines at one end;
signal storage regions each being connected to corresponding one of said vertical signal lines at the other end, configured to store a signal readout on the corresponding one of said vertical signal lines, and each including a control transistor having a current path being connected at one end to the other end of corresponding one of said vertical signal lines, a coupling capacitor having one end connected to the other end of said control transistor, a charge accumulating capacitor connected to the other end of said coupling capacitor, and a potential clamping transistor being connected to a junction node between said two capacitors;

a horizontal signal line onto which signals stored in said signal storage regions are sequentially transferred;

transistors each being provided on a signal path arranged between corresponding one of said vertical signal lines and said horizontal signal line; and a bias voltage control circuit configured to bias one of the drain and source of each of said transistors in the reverse direction with respect to the substrate region at least in a period during which the signals are transferred sequentially from said signal storage regions to said horizontal signal line, horizontal select transistors each having a current path connected to the junction node of two corresponding capacitors; and a horizontal reset transistor being connected to said horizontal signal line, wherein each of said control transistors, said potential clamping transistors, said horizontal select transistors, and said horizontal reset transistor is composed of an NMOS transistor provided by forming an active region in a p-well selectively formed on the surface of said semiconductor substrate, and wherein said bias voltage control circuit controls the reset potential of said horizontal reset transistor so as to bias one of the drain and source of each of said horizontal select transistors in the reverse direction with respect to the substrate region.

* * * * *